(12) United States Patent
Izu et al.

(10) Patent No.: US 8,719,578 B2
(45) Date of Patent: May 6, 2014

(54) DOCUMENT VERIFYING APPARATUS, DOCUMENT VERIFYING METHOD, AND COMPUTER PRODUCT

(75) Inventors: Tetsuya Izu, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 573 days.

(21) Appl. No.: 12/492,592

(22) Filed: Jun. 26, 2009

(65) Prior Publication Data

US 2009/0265558 A1 Oct. 22, 2009

Related U.S. Application Data

(63) Continuation of application No. PCT/JP2007/050290, filed on Jan. 12, 2007.

(51) Int. Cl.
*H04L 9/00* (2006.01)

(52) U.S. Cl.
USPC ............................. 713/176; 713/168; 726/26

(58) Field of Classification Search
USPC .......................................................... 713/176
See application file for complete search history.

(56) References Cited

U.S. PATENT DOCUMENTS

| | | | | |
|---|---|---|---|---|
| 2006/0288216 | A1* | 12/2006 | Buhler et al. | 713/176 |
| 2007/0106908 | A1* | 5/2007 | Miyazaki et al. | 713/189 |

FOREIGN PATENT DOCUMENTS

| | | |
|---|---|---|
| EP | 1498799 | 1/2005 |
| JP | 2004-364070 | 12/2004 |
| JP | 2005-51734 | 2/2005 |
| JP | 2006-60722 | 3/2006 |
| JP | 2006-180472 | 7/2006 |

OTHER PUBLICATIONS

Translation of 2006-060722.*
International Preliminary Report on Patentability, mailed Jul. 23, 2009, in corresponding PCT Application No. PCT/JP2007/050290 (12 pp.).
Miyazaki, K. et al., *A Digital Document Sanitizing Scheme with Disclosure Condition Control*, Proceedings of the 2004 Symposium on Cryptography and Information Security, vol. I of II (9 pp.).
Miyazaki, K. et al., Digitally Signed Document Sanitizing Scheme from Bilinear Maps, The 2005 Symposium on Cryptography and Information Security, Institute of Electronics, Information and Communication Engineers, 2005 (6 pp.).
International Search Report and Written Opinion, mailed Mar. 20, 2007, in corresponding International Application No. PCT/JP2007/050290 (10 pp. including translation of Search Report).

* cited by examiner

*Primary Examiner* — Edward Zee
*Assistant Examiner* — Baotran N To
(74) *Attorney, Agent, or Firm* — Staas & Halsey LLP

(57) ABSTRACT

A computer-readable recording medium stores therein a document verifying program. The document verifying program causes a computer to execute receiving input of an electronic document; dividing the electronic document received into arbitrary components; calculating a hash value for each of the components; correlating, for each component, the hash value calculated for the component and a random number allocated to the component according to an appearance position of the component in the electronic document; creating for each component and based on the hash value and the random number correlated for the component at the correlating, a first digital signature and a second digital signature that are different from each other; and appending to each component, the first digital signature and the second digital signature created for the component at the creating.

11 Claims, 19 Drawing Sheets

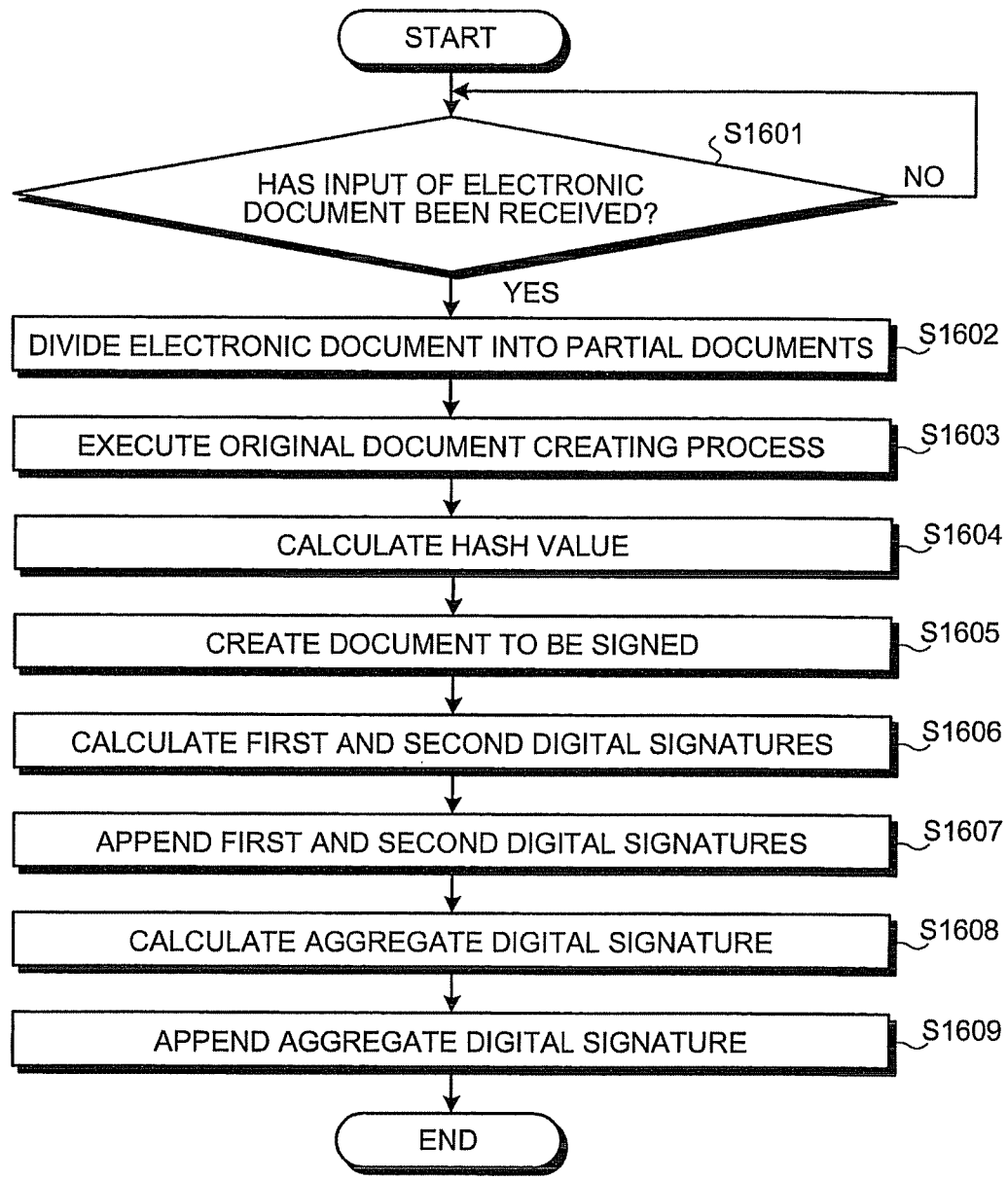

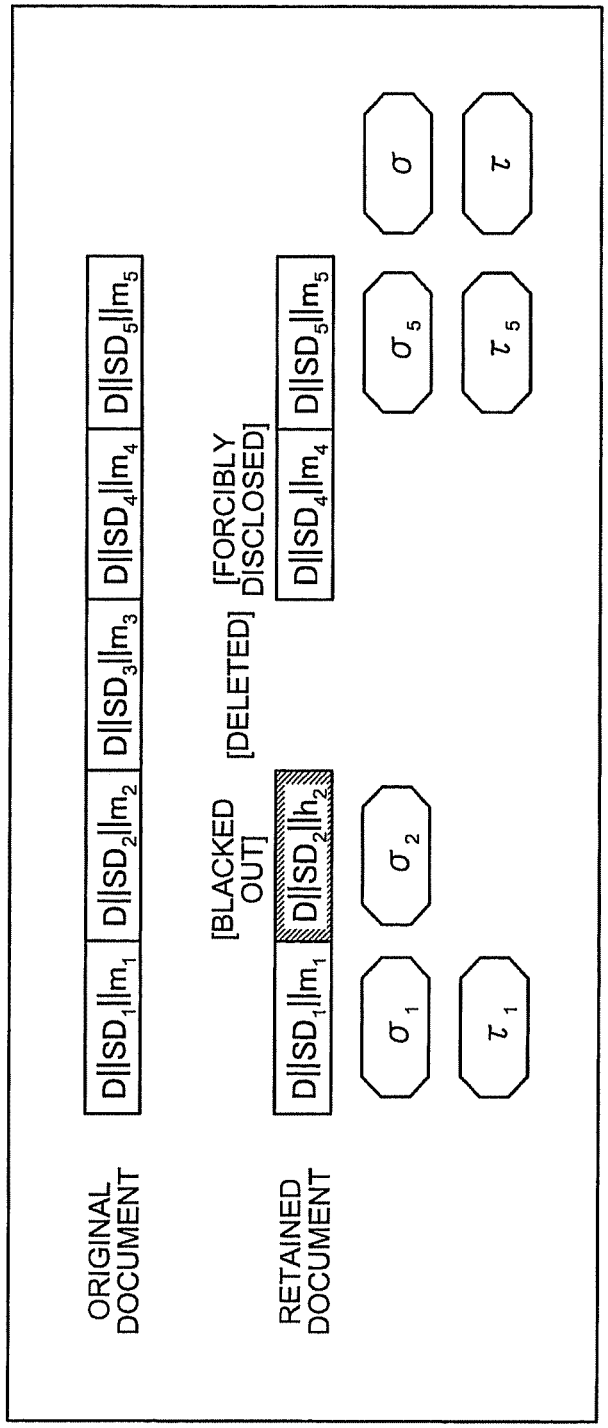

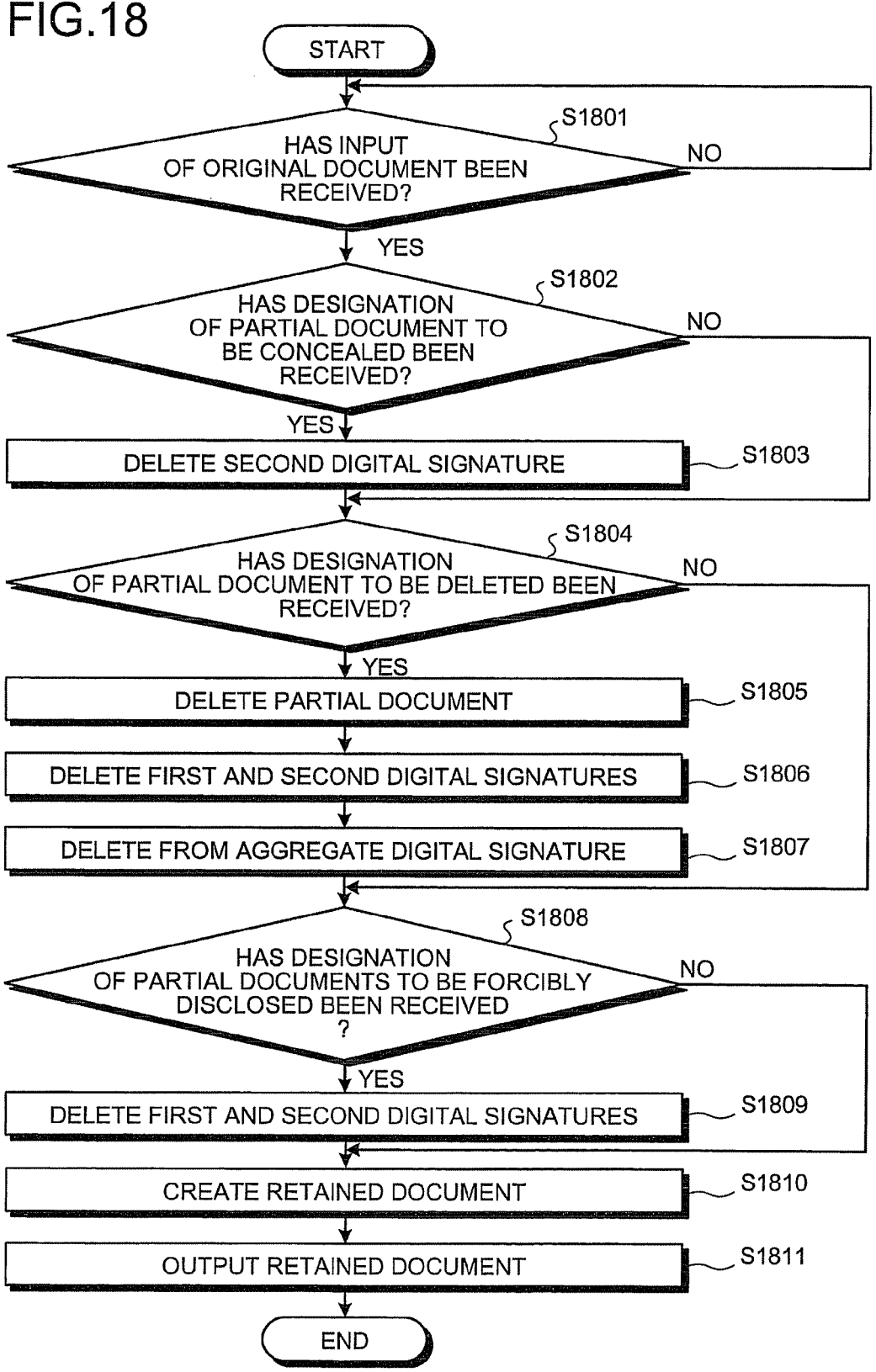

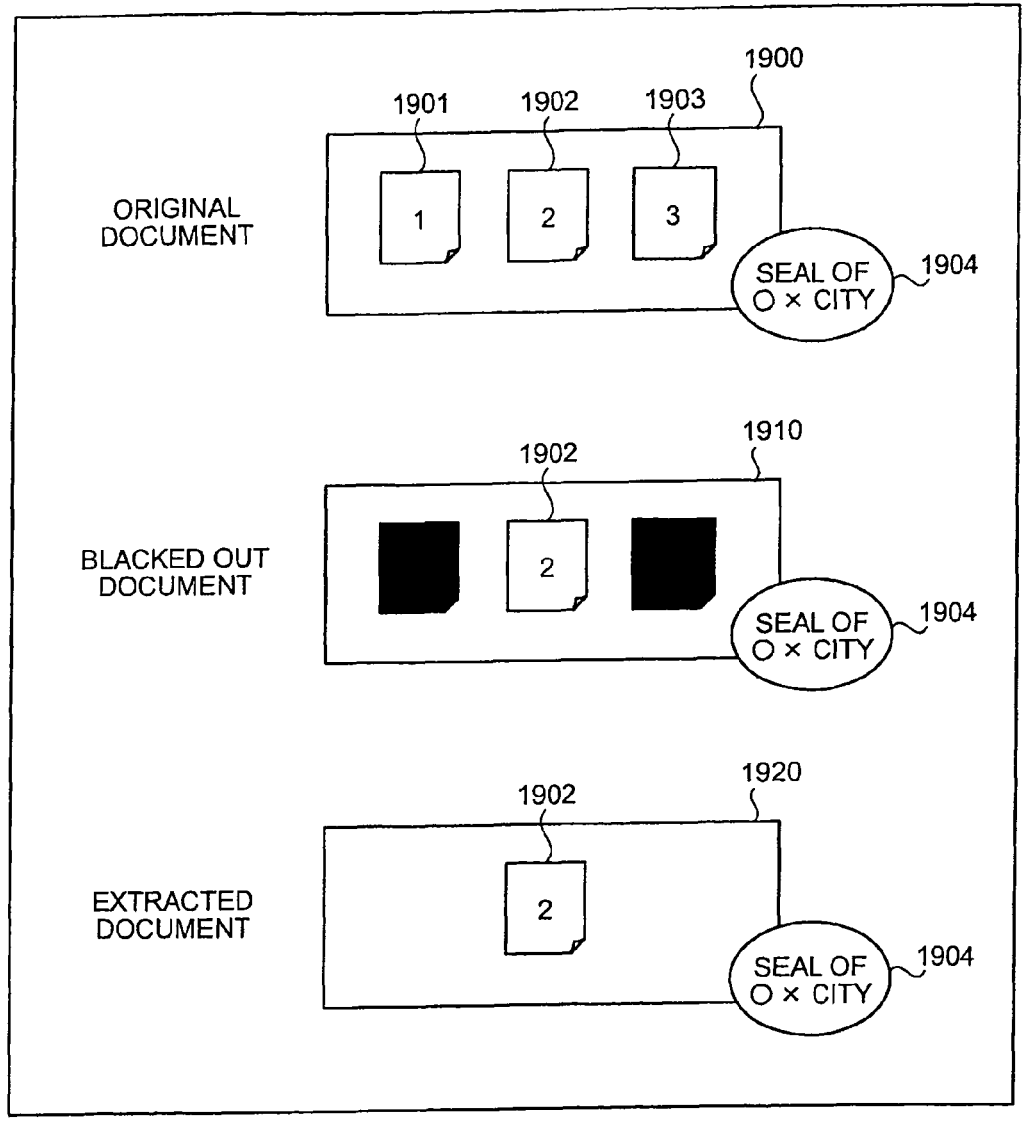

DOCUMENT VERIFYING APPARATUS, DOCUMENT VERIFYING METHOD, AND COMPUTER PRODUCT

This application is a continuation of International Application No. PCT/JP2007/050290, filed Jan. 12, 2007, the disclosure of which is herein incorporated in its entirety by reference.

FIELD

The embodiments discussed herein are related to a document verifying method, a document verifying apparatus, and computer product that verify the authenticity of an electronic document.

BACKGROUND

Conventionally, as a technology to verify the authenticity of a digital document, techniques employing a digital signature have been provided. These digital signature techniques append digital signatures to electronic documents to enable the author of an electronic document to be authenticated and the validity of the electronic document to be determined, thereby guaranteeing the authenticity of the electronic document.

On the other hand, though such digital signature techniques are very useful in terms of preventing tampering by an unauthorized user, a problem exists in terms of practical use of the electronic document. For example, if an electronic document is edited, the authenticity of the electronic document is not guaranteed after editing.

Therefore, even when information that should not be disclosed or unnecessary information is included in an electronic document, the electronic document cannot be edited, e.g., the information cannot be deleted, a factor significantly reducing usability. Accordingly, a technique that enables the editing of an electronic document and verification of the authenticity of the edited electronic document is desired.

For example, a technique has been provided in which an electronic document is divided into partial documents, the partial documents respectively are designated for disclosure or nondisclosure, where the partial documents designated for nondisclosure are blacked out (see, for example, Miyazaki, Kunihiko; Iwamura, Mitsuru; Matsumoto, Tsutomu; Sasaki, Ryoichi; Yoshiura, Hiroshi; Satoru, Tezuka; and Imai, Hideki; "A Digital Document Sanitizing Scheme with Disclosure Condition Control", Proceedings of the 2004 Symposium on Cryptography and Information Security). Use of this blacking-out signature technique guarantees the integrity of the portions to be disclosed and the confidentiality of the portions that are not to be disclosed (blacked out portions) in the electronic document.

Moreover, a technique has been provided in which an electronic document is divided into partial documents, a digital signature is appended each of the partial documents, the partial documents respectively are designated for disclosure or nondisclosure, where the partial documents designated for nondisclosure are deleted (see, for example, Japanese Laid-Open Patent Publication No. 2006-60722 and Miyazaki, Kunihiko; Hanaoka, Goichiro; and Imai, Hideki; "Digitally Signed Document Sanitizing Scheme from Bilinear Map", Proceedings of the 2005 Symposium on Cryptography and Information Security). Use of this extraction signature technique guarantees the integrity of the portions to be disclosed and the confidentiality of the portions that are not to be disclosed (deleted portions) in the electronic document.

FIG. 19 is a diagram of exemplary conventional digital signature techniques. As depicted in FIG. 19, an original document 1900 is divided into partial documents 1901, 1902, and 1903 (for example, into pages) and a digital signature 1904 is appended with respect to the entire original document 1900.

A blacked out document 1910 is that obtained by blacking out sensitive portions of the original document 1900, e.g., the partial documents 1901 and 1903, according to the technique described by Miyazaki, et al in "A Digital Document Sanitizing Scheme with Disclosure Condition Control" cited above herein. The authenticity of the partial document 1902, the portion to be disclosed, is verifiable according to the digital signature 1904.

Further, an extracted document 1920 is that obtained by extracting the partial document 1902 from the original document 1900 according to the technique recited in Japanese Laid-Open Patent Publication No. 2006-60722 or the technique described by Miyazaki, et al in "Digitally Signed Document Sanitizing Scheme from Bilinear Map" cited above. The authenticity of the partial document 1902, the portion to be disclosed, is verifiable according to the digital signature 1904.

However, with the conventional digital signature techniques above, an electronic document can be subject to only one of the processes, the blacking out process or the deleting process (extracting process). Therefore, a mixture of partial documents to be blacked out and partial documents to be deleted cannot be designated in the same electronic document, thereby resulting in a problem of reduced usability.

For example, assuming that the original document 1900 depicted in FIG. 19 is minutes of a governmental agency, the partial document 1901 (the first page) includes a list of meeting attendees, the partial document 1902 (the second page) includes the main contents of the meeting, and the partial document 1903 (the third page) includes a list of delinquent taxpayers.

If the blacked out document 1910 is disclosed, although a viewer is unable to identify the specific contents of the first page and the third page, the viewer can conjecture that some information is included in the portions before and after the main contents of the meeting described on the second page in the original document 1900.

Therefore, even if the partial documents 1901 and 1903 including sensitive information are blacked out, the viewer can infer the presence of some information based on the portions blacked out. Thus, a problem has arisen in that the confidentiality of the blacked out document 1910 as a whole cannot be completely ensured.

Meanwhile if the extracted document 1920 is disclosed, the viewer is unable to know the existence of the first page and the third page and, therefore, the viewer is unable to identify the specific contents of the partial documents 1901 and 1903.

However, for example, it may be desirable to indicate the existence of the delinquent taxpayers by leaving the third page, in which case personal information, such as names, on the third page should be concealed. Nonetheless, according to this technique, the entire third page is deleted from the extracted document 1920. That is, in the extracted document 1920, the partial documents 1901 and 1903 can be sanitized only by deletion and, therefore, a problem has arisen in that information to be disclosed is also deleted.

SUMMARY

According to an aspect of an embodiment, a computer-readable recording medium stores therein a document verifying program. The document verifying program causes a computer to execute receiving input of an electronic document; dividing the electronic document received into arbitrary components; calculating a hash value for each of the components; correlating, for each component, the hash value calculated for the component and a random number allocated to the component according to an appearance position of the component in the electronic document; creating for each component and based on the hash value and the random number correlated for the component at the correlating, a first digital signature and a second digital signature that are different from each other; and appending to each component, the first digital signature and the second digital signature created for the component at the creating.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 is a flowchart of a digital signature creating process executed by the document verifying apparatus according the fourth embodiment;

FIG. 17 is a diagram of an overview of an editing process executed by the document verifying apparatus according to the fourth embodiment;

FIG. 18 is a flowchart of the editing process executed by the document verifying apparatus according to the fourth embodiment; and FIG. 19 is a diagram of exemplary conventional digital signature techniques.

DESCRIPTION OF EMBODIMENTS

Preferred embodiments of the present invention will be explained with reference to the accompanying drawings.

Figure 1:
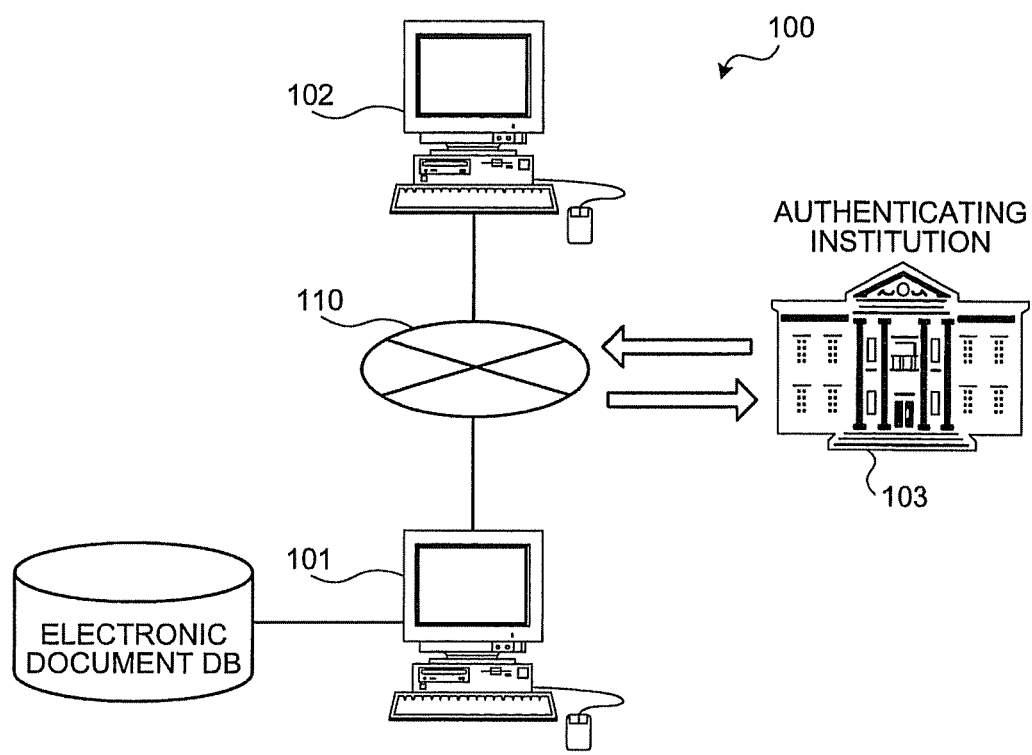
FIG. 1 is a diagram of a configuration of an electronic document disclosing system according to an embodiment of the present invention.

FIG. 1 is a diagram of a configuration of an electronic document disclosing system according to an embodiment of the present invention.

As depicted in FIG. 1, an electronic document disclosing system 100 includes a document verifying apparatus 101 that discloses information and a document verifying apparatus 102 that requests the disclosure of information. The document verifying apparatus 101 and the document verifying apparatus 102 are connected through a network such as the Internet and mutually communicate.

An electronic document disclosed by the electronic document disclosing system 100 includes highly confidential personal information such as an electronic family register issued by an governmental agency, an electronic medical chart issued by a medical facility, and an electronic report card issued by an educational institution. Further, the electronic document may be an official document whose disclosure may be requested of a governmental agency of a municipality.

The document verifying apparatus 101 is a computer apparatus that includes an electronic document DB. Electronic documents, such as an electronic family register and an electronic report card, may be created by the document verifying apparatus 101 that discloses information or may be created by another apparatus. Nonetheless, the document verifying apparatus 101 processes electronic documents so that the electronic documents are verifiable in terms of authenticity, and stores the electronic documents in the electronic document DB.

In this example, to guarantee the validity of the author of an electronic document and that of the electronic document, a digital signature certified by a (third-party) authenticating institution 103 is appended to the electronic document. Further, the document verifying apparatus 102 is a computer apparatus used by a user who requests the disclosure of information.

When the document verifying apparatus 101 receives from the document verifying apparatus 102, a request signal indicating a request for the disclosure of information, the apparatus 101 searches the electronic document DB for the corresponding electronic document. The document verifying apparatus 101 transmits to the document verifying apparatus 102, the retrieved electronic document as the document to be disclosed. In this case, the document verifying apparatus 101 may set attributes such as black out, deletion, and forcible disclosure, for partial documents of the retrieved electronic document.

Meanwhile, the document verifying apparatus 102 that requests information may transmit to the document verifying apparatus 101 that discloses information, a request signal indicative of an request for the disclosure of information. As a result of the transmission of the request signal, the document verifying apparatus 102 receives the disclosed document from the document verifying apparatus 101. The document verifying apparatus 102 may verify the authenticity of the disclosed document received.

It is assumed that, for example, via the document verifying apparatus 102, a disclosure of public documents concerning pollution problems is requested of the document verifying apparatus 101 provided at a governmental agency of a municipality. As a result, the user of the document verifying apparatus 102 can obtain and view public documents concerning pollution problems.

In this example, an officer of the governmental agency may set various types of attributes for the contents of public documents to be disclosed. For example, the officer may set some of the public documents that concern the current state of air pollution and water pollution and for which disclosure is obligatory, to be forcibly disclosed; portions of the public documents that include the names of the victims who suffered from the pollution, to be documents blacked out; and portions of the public documents that have the addresses of the victims described therein, to be deleted.

In this manner, the user of the document verifying apparatus 101 may set arbitrarily various types of attributes in the public documents to be disclosed. Concerning the authenticity of public documents to which alterations have been made, such as by the setting of various types of attributes, the document verifying apparatus 102, for example, may verify the authenticity and may verify whether any unauthorized alteration has been made.

In the explanation above, the apparatus used by the user who discloses the information is represented by the document verifying apparatus 101 and the apparatus used by the user who requests the information disclosure is represented by the document verifying apparatus 102. However, the document verifying apparatus 102 may cerate specific information and may disclose the information to the user who uses the document verifying apparatus 101.

Figure 2:
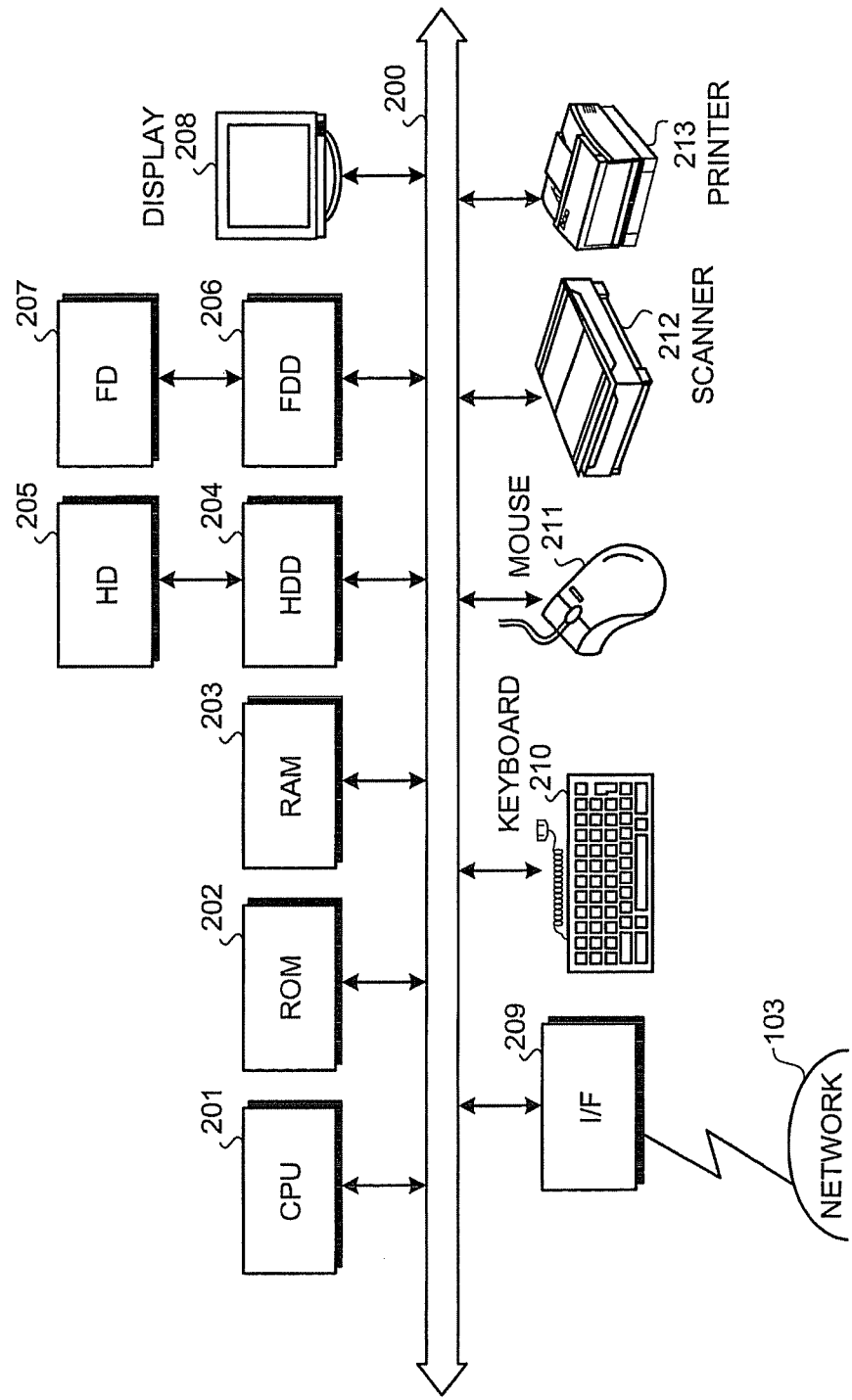
FIG. 2 is a block diagram of a hardware configuration of a computer apparatus according to the embodiment.

FIG. 2 is a block diagram of a hardware configuration of a computer apparatus according to the embodiment.

As depicted in FIG. 1, the computer apparatus includes a central processing unit (CPU) 201, a read-only memory (ROM) 202, a random access memory (RAM) 203, a hard disk drive (HDD) 204, a hard disk (HD) 205, a flexible disk drive (FDD) 206, a flexible disk (FD) 207 as an example of a removal recording medium, a display 208, an interface (I/F) 209, a keyboard 210, a mouse 211, a scanner 212, and a printer 213, connected to one another by way of a bus 200.

The CPU 201 governs overall control of the computer apparatus, e.g., the document verifying apparatus 101, 102. The ROM 202 stores therein programs such as a boot program. The RAM 203 is used as a work area of the CPU 201.

The HDD 204, under the control of the CPU 201, controls the reading and writing of data with respect to the HD 205. The HD 205 stores therein the data written under control of the HDD 204.

The FDD 206, under the control of the CPU 201, controls the reading and writing of data with respect to the FD 207. The FD 207 stores therein the data written under control of the FDD 206, the data being read by the computer apparatus.

In addition to the FD 207, a removable recording medium may include a compact disk read-only memory (CD-ROM), compact disk-recordable (CD-R), a compact disk-rewritable (CD-RW), a magneto optical disk (MO), a Digital Versatile Disk (DVD), or a memory card. The display 208 displays a cursor, an icon, a tool box, and data such as document, image, and function information. The display 208 may be, for example, a cathode ray tube (CRT), a thin-film-transistor (TFT) liquid crystal display, or a plasma display.

The I/F 209 is connected to a network 110 such as the Internet through a telecommunications line and is connected to other devices by way of the network 110. The I/F 209 administers an internal interface with the network 110, and controls the input and output of data with respect to external devices. The I/F 209 may be, for example, a modem or a local area network (LAN) adapter.

The keyboard 210 is equipped with keys for the input of characters, numerals, and various instructions, and data is entered through the keyboard 210. The keyboard 210 may be a touch-panel input pad or a numeric keypad. The mouse 211 performs cursor movement, range selection, and movement, size change, etc., of a window. The mouse 211 may be a trackball or a joystick provided the trackball or joystick has similar functions as a pointing device.

The scanner 212 optically reads an image and takes in the image data into the computer apparatus. The scanner 212 may have an optical character recognition (OCR) function. The printer 213 prints image data and document data. The printer 213 may be, for example, a laser printer or an ink jet printer.

Figure 3:
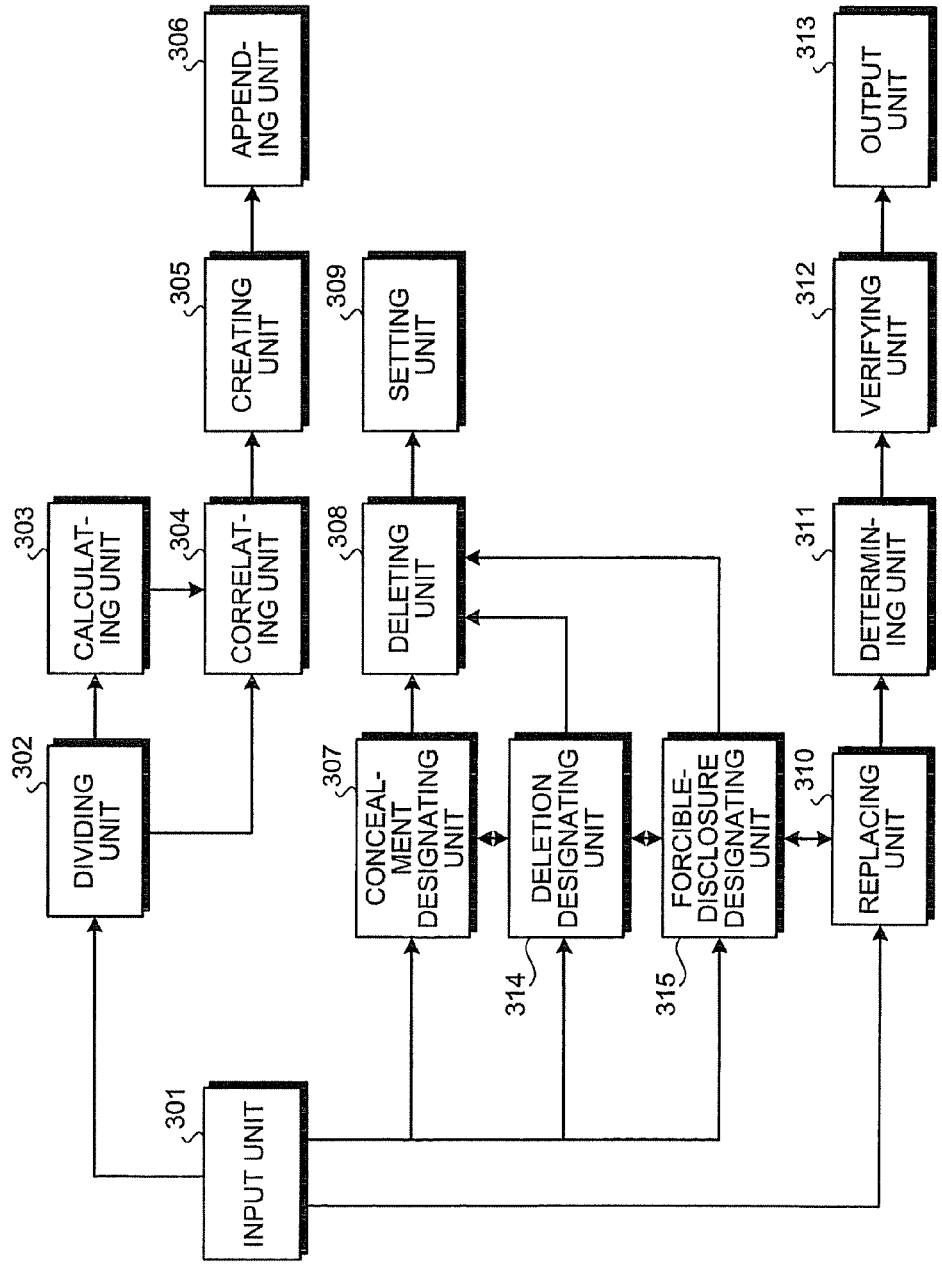
FIG. 3 is a block diagram of a functional configuration of a document verifying apparatus according to the embodiment.

FIG. 3 is a block diagram of a functional configuration of a document verifying apparatus according to the embodiment.

In FIG. 3, the document verifying apparatus includes an input unit 301, a dividing unit 302, a calculating unit 303, a correlating unit 304, a creating unit 305, an appending unit 306, a concealment designating unit 307, a deleting unit 308, a setting unit 309, a replacing unit 310, a determining unit 311, a verifying unit 312, an output unit 313, a deletion designating unit 314, and a forcible-disclosure designating unit 315.

The input unit 301 receives input of an electronic document. The electronic document input through the input unit 301 is written into a memory such as the RAM 203 and the HD 205. The electronic document is a generic name for documents handled by computers and is electronic data created using, for example, application software that creates documents. An electronic document may be confidential personal information such as an electronic family register issued by a governmental agency or an electronic report card issued by an educational institution.

An electronic document may be created by a document verifying apparatus and further may be a document created by another apparatus. When an electronic document is created by another apparatus, the electronic document is obtained by the document verifying apparatus through the network 110 such as, for example, the Internet.

The dividing unit 302 divides the electronic document received through the input unit 301 into arbitrary components. More specifically, the dividing unit 302 reads the electronic document written in the memory, such as the RAM 203 and the HD 205, and divides the electronic document into arbitrary components. The dividing unit 302 may divide the electronic document, for example, at one-byte intervals from the head of the electronic document (for example, the starting point of the reading of the electronic document input) or into characters, words, sentences, or pages.

Alternatively, a user may designate the positions at which the electronic document is to be divided and thereby, the electronic document may be divided into plural components. When the electronic document is a document described in an Extensible Markup Language (XML), etc., the electronic document may be divided into the smallest elements forming the electronic document. The electronic document having been divided into arbitrary components by the dividing unit 302 is written into the memory such as the RAM 203 and the HD 205.

The calculating unit 303 calculates a hash value for each of the components divided by the dividing unit 302. More specifically, the calculating unit 303 reads the electronic document divided into the arbitrary components from the memory such as the RAM 203 or the HD 205 and calculates a hash value for each of the components. Yet more specifically, the calculating unit 303 calculates a hash value that is a pseudo random number of a fixed length, from each of the components by using a hash function.

When data is transmitted and received through the network 110 such as the Internet, whether the data has been altered during communication may be determined by obtaining the hash values of the data at both ends of the communication path and comparing the values. Because the hash function includes an irreversible one-way function, the components that constitute the original text cannot be restored from the hash values and the creation of data having the same hash values is extremely difficult. The hash values calculated by the calculating unit 303 are written into the memory such as the RAM 203 or the HD 205.

The correlating unit 304 correlates the hash value of each of the components calculated by the calculating unit 303 with a random number allocated to the component according to the order of the appearance position of the component in the electronic document. More specifically, the correlating unit 304 reads the hash value of each of the components and the random numbers respectively allocated to the components from the memory such as the RAM 203 or the HD 205 and correspondingly correlates the hash value and the random numbers.

The random numbers may be genuine random numbers or pseudo random numbers and, are respectively allocated to each of the components according to order of appearance in the electronic document, i.e., an appearance position. A genuine random number refers to each element included in an irregular number sequence that has no regularity. More specifically, a genuine random number is generated by using a random physical phenomenon. A pseudo random number refers to each element included in a number sequence that is obtained by deterministic calculation and that appears to be a random number sequence having no regularity.

More specifically, a pseudo random number is a random number that is generated by a computer and that is as difficult as possible predict, where the unbiased nature of the generated number is enhanced. A pseudo random number may be generated by using, for example, a pseudo random number generator (pseudo random number generating method). A pseudo random number generator is an apparatus that outputs a sequence that is indistinguishable from random numbers by a polynomial time calculator.

More specifically, for example, each of the components is allocated with random numbers generated such that the random numbers are in ascending order (the value of each of the random numbers increasing in magnitude) or descending order (the value of each of the random numbers decreasing in magnitude) according to the order in which the electronic document is read into the document verifying apparatus. The random numbers allocated to the components and the correlated hash values are written into the memory such as the RAM 203 and the HD 205.

The creating unit 305 creates a first digital signature and a second digital signature that are different from each other for each component based on the respective hash values and the corresponding random numbers correlated with the hash values by the correlating unit 304. More specifically, the creating unit 305 reads the correlated hash values and random numbers from the memory such as the RAM 203 and the HD 205, and creates the first digital signature and the second digital signature which are different from each other, for each component.

A digital signature is signature information appended to an electronic document to authenticate the validity of the electronic document. Similar to a physical signature (such as a seal), a digital signature is for certifying the true author of an electronic document and validity of the electronic document (that no alteration has been made to the electronic document). Verification of the validity of the electronic document by an arbitrary user may be enabled by the use of a public key cryptograph, etc.

In this case, the authenticating institution 103 that is reliable may append a signature to a public key with an aim to guarantee the validity of the public key. A method of creating a digital signature can be, for example, an RSA signature scheme and an ESIGN signature, based on decomposition into prime factors; an ELGamal signature and a digital signature algorithm (DSA) signature, based on a discrete logarithm; and an elliptic ELGamal signature and an elliptic DSA signature, based on an elliptic discrete logarithm.

More specifically, for example, the creating unit 305 may create two different digital signatures by calculating the first digital signature using a first creating scheme and calculating the second digital signature using a second creating scheme that is different from the first creating scheme. That is, the creating unit 305 creates the first and the second digital signatures that are different from each other, from one creation origin by changing the algorithm used when each of the digital signatures is created.

Alternatively, the creating unit 305 may create two digital signatures that are different from each other by preparing a hash value and a random number that are the creation origins of the first digital signature and by preparing a hash value and a random number that are the creation origin of the second digital signature.

In this case, because the hash value and the random number that constitute the creation origin are prepared for each of the digital signatures, the first and the second digital signatures that are different from each other may be created using one creation scheme. The first and the second digital signatures that are different from each other and that are created by the creating unit 305 are written into the memory such as the RAM 203 and the HD 205.

The correlating unit 304 may also correlate a random number that is allocated to each of the components and that is common to all of the components constituting the electronic document (hereinafter, "common random number"), a hash value of a component to which the common random number is allocated, and the random number allocated to the component. More specifically, the correlating unit 304 reads the hash value of the component and the common random number allocated to the component from the memory such as the RAM 203 or the HD 205, and correlates these with each other.

The common random number is a random number unpredictably allocated to each electronic document and is a value common to all the components constituting the electronic document. The common random number is generated using, for example, the above pseudo random number generator. The common random number, the hash value, and the random number that are correlated with each other by the correlating unit 304 are written into the memory such as the RAM 203 or the HD 205.

In this case, the creating unit 305 creates the first and the second digital signatures for each of the components based on the common random number, the hash value, and the random number that are correlated with each other by the correlating unit 304. More specifically, the creating unit 305 reads the common random number, the hash value, and the random number that are correlated with each other from the memory such as the RAM 203 and the HD 205 and creates the first and the second digital signatures for each of the components.

The creating unit 305 creates an aggregate digital signature having the first or the second digital signatures for the components aggregated therein. More specifically, the creating unit 305 reads the first or the second digital signatures for the components from the memory, such as the RAM 203 and the HD 205, and creates the aggregate digital signature. The aggregate digital signature is an aggregate of the first or the second digital signatures that are created for the components.

More specifically, for example, the aggregate digital signature may be constituted by a product of the digital signatures (the first or the second digital signatures) for the components, or may be constituted by the sum of the digital signatures (the first or the second digital signatures) for the components. The aggregate digital signature created by the creating unit 305 is written into the memory such as the RAM 203 and the HD 205.

The appending unit 306 appends the first and the second digital signatures created by the creating unit 305 to the corresponding component. More specifically, the appending unit 306 reads the first digital signatures, the second digital signatures, and the components from the memory, such as the RAM 203 and the HD 205, and corresponding appends the signatures to the component. An electronic document whose components have been appended with the first digital signatures and the second digital signatures by the appending unit 306 is written into the memory such as the RAM 203 and the HD 205.

The appending unit 306 further appends the aggregate digital signature created by the creating unit 305 to the electronic document. The electronic document to which the aggregate digital signature has been appended by the appending unit 306 is written into the memory such as the RAM 203 and the HD 205.

The correlating unit 304 may correlate the common random number allocated to each of the components with the hash value of a component to which the common random number is allocated. In this case, the creating unit 305 creates the first and the second digital signatures for each component based on the common random number and the hash values respectively correlated to the common random number by the correlating unit 304.

The concealment designating unit 307 receives designation of components to be concealed among the components of the electronic document. More specifically, the concealment designating unit 307 receives designation of components among the components constituting the electronic document read from the memory such as the RAM 203 and the HD 205.

Yet more specifically, for example, the user may designate the components to be concealed by operating the keyboard 210 or the mouse 211. The components designated through the concealment designating unit 307 are concealed to be unrecognizable by the user through an implementation of, for example, black out processing. An electronic document having components to be concealed as designated through the concealment designating unit 307 is written into the memory such as the RAM 203 and the HD 205.

The deleting unit 308 deletes the second digital signatures appended to the components designated through the concealment designating unit 307. More specifically, the deleting unit 308 reads the second digital signatures appended to the components designated through the concealment designating unit 307 from the memory, such as the RAM 203 and the HD 205, and deletes the signatures. Thus, the digital signatures appended to the components designated by the concealment designating unit 307 include only the first digital signatures.

By correlating the hash values of the components whose second digital signatures have been deleted by the deleting unit 308, the setting unit 309 sets the electronic document to be an electronic document having components to be concealed. More specifically, the setting unit 309 reads from the memory such as the RAM 203 and the HD 205, the electronic document having components that are to be concealed and whose second digital signatures have been deleted by the deleting unit 308, and accordingly sets the electronic document. That is, only when the second digital signatures appended to the components designated through the concealment designating unit 307 have been deleted by the deleting unit 308, the setting unit 309 sets the relevant components to be components to be concealed.

In this case, the correlating unit 304 correlates the hash values of the components designated to be concealed with the electronic document set by the setting unit 309 and thereby, the hash values of the components designated to be concealed are retained in the electronic document. That is, by implementation of black out processing, etc. with respect to the components designated to be concealed, the components become unrecognizable to the user while the hash values of the components to be concealed are retained by the document verifying apparatus.

The input unit 301 receives input of the electronic document set by the setting unit 309. The electronic document set by the setting unit 309 and input through the input unit 301 is written into the memory such as the RAM 203 and the HD 205. The electronic document input in this example is a document to be verified for authenticity and is, for example, the electronic document depicted in FIG. 1 input to the document verifying apparatus 102 by the user who requests the disclosure.

The replacing unit 310 calculates the hash values of the components of the electronic document input through the input unit 301 and replaces the components with the hash values calculated. More specifically, the replacing unit 310 reads the electronic document from the memory, such as the RAM 203 and the HD 205, and replaces the components with the respective hash values of the components. That is, with respect to the electronic document input through the input unit 301, the replacing unit 310 replaces components thereof with the respective hash values and thereby, restores the data that is the creation origin of the first digital signatures and the second digital signatures.

In this case, because the hash values of the components to be concealed are retained in the document verifying apparatus, with the exception of the components to be concealed among the components of the electronic document, all the components are replaced with hash values respectively calculated for the components to be replaced. The electronic document whose components have been replaced by the replacing unit 310 is written into the memory such as the RAM 203 and the HD 205.

The determining unit 311 determines, based on the aggregate digital signature appended to the electronic document, the validity of the hash values replacing the components and the validity of random numbers allocated to the hash values. More specifically, the determining unit 311 reads the aggregate digital signature appended to the electronic document and the electronic document whose components have been replaced by the replacing unit 310 from the memory such as the RAM 203 and the HD 205 and determines validity.

Yet more specifically, the determining unit 311 decodes the aggregate digital signature appended to the electronic document and determines whether each hash value replacing the components and the random number allocated to the hash value coincide.

The determining unit 311 may further determine, based on the aggregate digital signature appended to the electronic document, the validity of the common random number allocated to each of the hash values replacing the components. More specifically, the determining unit 311 decodes the aggregate digital signature appended to the electronic document and determines whether the hash values replacing the components coincide with the hash values respectively correlated with the random numbers and the common random number.

The determining unit 311 may further determine whether the random numbers allocated to the components of the electronic document input through the input unit 301 correspond to the order of the appearance positions of the components in the electronic document. More specifically, the determining unit 311 determines whether the random numbers allocated to the components of the electronic document are in ascending order or descending order according to the order of the appearance positions of the components in the electronic document.

The determining unit 311 may further determine whether the common random number allocated to the components is common to all the components of the electronic document input through the input unit 301. More specifically, the determining unit 311 determines whether the common random number allocated to the each of the components constituting the electronic document is same.

The determining unit 311 may further determine, with respect to the electronic document input through the input unit 301, the validity of each of the components based on the first digital signatures or the second digital signatures appended to the components. More specifically, the determining unit 311 decodes the first digital signature or the second digital signature appended to the components and determines whether the decoded digital signatures coincide with the components. The determination result by the determining unit 311 is written into the memory such as the RAM 203 and the HD 205.

The verifying unit 312 verifies the authenticity of the electronic document based on the determination result of the determining unit 311. More specifically, the verifying unit 312 reads the determination result by the determining unit 311 from the memory, such as the RAM 203 and the HD 205, and verifies the authenticity of the electronic document. Yet more specifically, for example, the verifying unit 312 verifies the electronic document to be authentic when the hash values replaced by the replacing unit 310 and the random numbers allocated to the hash values coincide with the decoding result of the aggregate digital signature appended to the electronic document.

The verifying unit 312 verifies the electronic document to be authentic when the random numbers allocated to the components correspond to the order of the appearance positions of the components in the electronic document. The verifying unit 312 may further verify the electronic document to be authentic when the common random number allocated to each of the components is common to all the components. Alternatively, the verifying unit 312 may further verify the electronic document to be authentic when each of the components is determined to be valid. The verification result of the verifying unit 312 is written into the memory such as the RAM 203 and the HD 205.

The output unit 313 outputs the verification result of the verifying unit 312. More specifically, the output unit 313 reads the verification result by the verifying unit 312 from the memory, such as the RAM 203 and the HD 205, and outputs the verification result. Yet more specifically, the output unit 313 outputs the verification result indicating the success of the verification when the electronic document is verified to be authentic by the verifying unit 312. The output unit 313 outputs the verification result indicating the failure of the verification when the electronic document is verified not to be authentic by the verifying unit 312.

The deletion designating unit 314 receives designation of components to be deleted among the components of the electronic document. More specifically, the deletion designating unit 314 reads the electronic document from the memory, such as the RAM and the HD 205, and receives designation of components to be deleted. The components designated through the deletion designating unit 314 are deleted from the electronic document.

The deleting unit 308 deletes the first digital signatures and the second digital signatures appended to the components that have been designated through the deletion designating unit 314. The deleting unit 308 further deletes the first digital signatures or the second digital signatures appended to the components to be deleted from the aggregate digital signature appended to the electronic document.

More specifically, the deleting unit 308 reads from the memory such as the RAM 203 and the HD 205, the first digital signatures and the second digital signatures appended to the components that have been designated through the deletion designating unit 314 and deletes the first digital signatures and the second digital signatures. The deleting unit 308 further reads from the memory such as the RAM 203 and the HD 205, the aggregate digital signature appended to the electronic document and deletes from the aggregate digital signature, the first or the second digital signatures appended to the components to be deleted.

Yet more specifically, when the aggregate digital signature appended to the electronic document is an aggregate of, for example, the first digital signatures of the components, the deleting unit 308 deletes from the aggregate digital signature, the first digital signatures appended to the components to be deleted.

The setting unit 309 sets the electronic document to be an electronic document having components to be deleted, where the first digital signatures and the second digital signatures of the components to be deleted have been deleted by the deleting unit 308. More specifically, the setting unit 309 reads from the memory such as the RAM 203 and the HD 205, the electronic document having components that are to be deleted, where the first and second digital signatures of the components to be deleted have been deleted by the deleting unit 308 and accordingly sets the electronic document. Thus, the components designated through the deletion designating unit 314 are deleted.

The forcible-disclosure designating unit 315 receives designation of components to be forcibly disclosed among the components of the electronic document. More specifically, the forcible-disclosure designating unit 315 reads the electronic document from the memory, such as the RAM 203 and the HD 205, and receives designation of components to be forcibly disclosed. The components designated through the forcible-disclosure designating unit 315 are components to be forcibly disclosed and cannot be designated as components to be concealed or deleted.

The deleting unit 308 deletes the first digital signatures and the second digital signatures appended to the components designated by the forcible-disclosure designating unit 315. More specifically, the deleting unit 308 reads from the memory such as the RAM 203 and the HD 205, the first digital signatures and the second digital signatures appended to the components designated through the forcible-disclosure designating unit 315 and deletes the signatures. Thus, the components designated through the forcible-disclosure designating unit 315 have no digital signatures appended thereto.

The setting unit 309 sets the electronic document to be an electronic document having components to be forcibly disclosed, where the first digital signatures and the second digital signatures of the components to be forcibly disclosed have been deleted by the deleting unit 308. More specifically, the setting unit 309 reads from the memory such as the RAM 203 and the HD 205, the electronic document having components to be forcibly disclosed, where the first digital signatures and the second digital signatures of the components to be disclosed have been deleted by the deleting unit 308, and accordingly sets the electronic document.

Thus, the components designated through the forcible-disclosure designating unit 315 are forcibly disclosed in the electronic document. The electronic document set by the setting unit 309 is written into the memory such as the RAM 203 and the HD 205.

Respective functions of the input unit 301, the dividing unit 302, the calculating unit 303, the correlating unit 304, the creating unit 305, the appending unit 306, the concealment designating unit 307, the deleting unit 308, the setting unit 309, the replacing unit 310, the determining unit 311, the verifying unit 312, the output unit 313, the deletion designating unit 314, and the forcible-disclosure designating unit 315 are implemented, for example, by causing the CPU 201 to execute a program recorded on a recording medium such as the ROM 202, the RAM 203, and the HD 205 depicted in FIG. 2, or by the I/F 209.

A digital signature creating process is a process that is executed by, for example, the document verifying apparatus 101 that discloses information. An example where one digital signature is appended to each of the components of an electronic document will be described.

Figure 4:
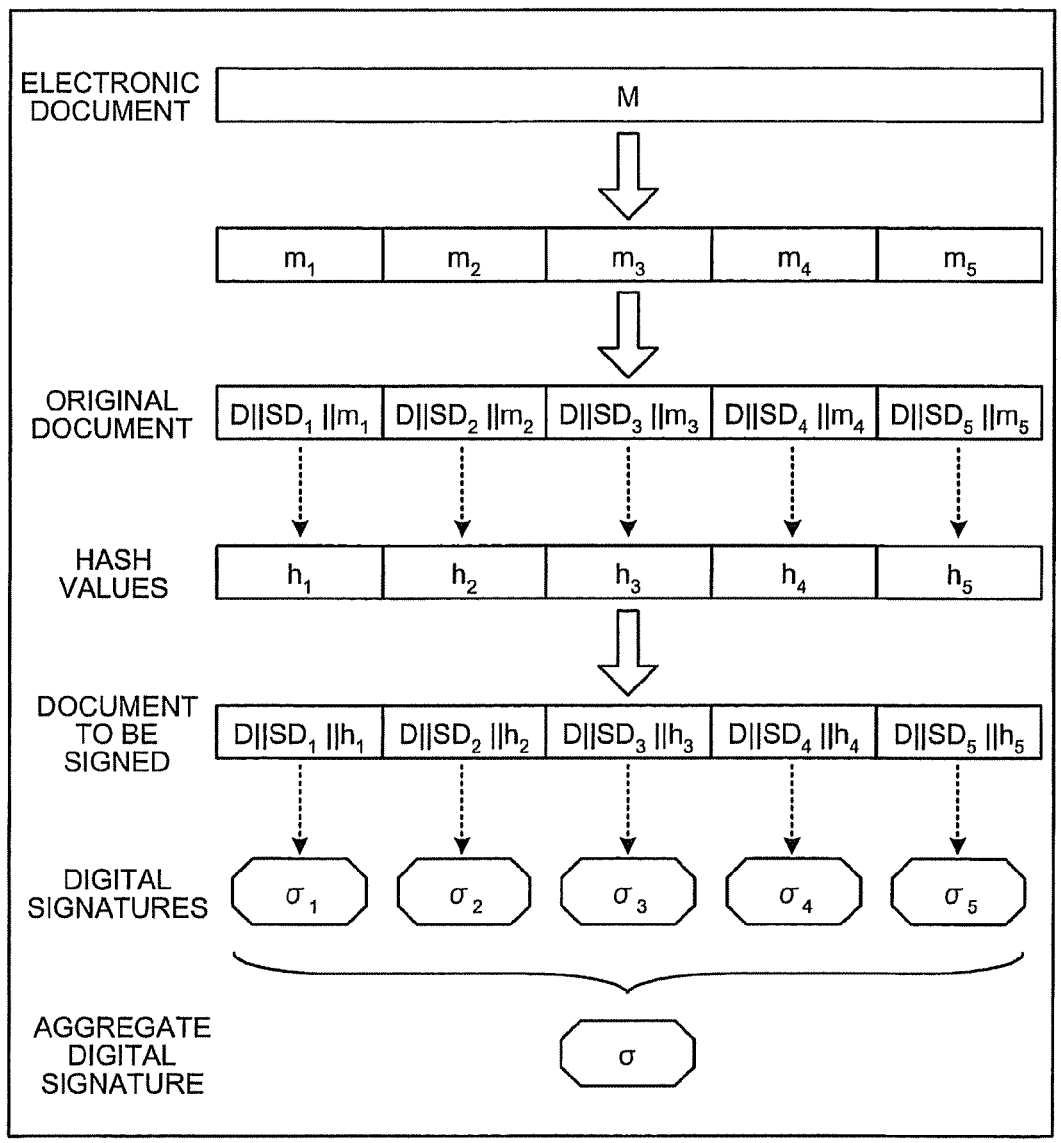
FIG. 4 is a diagram of an overview of a digital signature creating process executed by the document verifying apparatus according to the embodiment.

FIG. 4 is a diagram of an overview of a digital signature creating process executed by the document verifying apparatus according to the embodiment. As depicted in FIG. 4, an electronic document M is divided into partial documents "$m_1, m_2, \ldots, m_5$". The unit of the partial documents obtained by dividing the electronic document M is arbitrary and the electronic document M may be divided into, for example, characters, words, sentences, or pages. The partial documents correspond to the above components obtained by the division executed by the dividing unit 302.

An unpredictable document ID and an unpredictable partial document ID are appended to each of partial documents using genuine random numbers or the pseudo random numbers (hereinafter, "random numbers"). More specifically, for example, a document ID and a partial document ID may be appended to each of the partial documents and may be described therein, or may be correlated respectively with the partial documents and may be recorded in the electronic document DB.

The document ID is a value common to the partial documents "$m_1, m_2, \ldots, m_5$" that constitute the electronic document M. The document ID commonly appended to the partial documents is denoted herein by "D". The document ID corresponds to the common random number that is correlated by the correlating unit 304 with the above hash values of the components constituting the electronic document.

The partial document IDs are values that differ according to partial component and are appended such that the partial document IDs are in ascending order according to the order of the appearance positions of the partial documents "$m_1, m_2, \ldots, m_5$" in the electronic document M. The partial document IDs appended to the partial documents "$m_1, m_2, \ldots, m_5$" are respectively denoted by "$SD_1, SD_2, \ldots, SD_5$". The partial document IDs correspond to the random numbers that are correlated by the correlating unit 304 with the above hash values of the components that constitute the electronic document.

The document ID and the partial document IDs are created by, for example, the pseudo random number generator. The pseudo random numbers generated by the pseudo random number generator are added to the partial documents as the document ID and the partial document IDs. The electronic document M whose partial documents have been appended respectively with a document ID and a partial document ID is hereinafter referred to as "original document".

An exemplary appending scheme of appending a unique partial ID to each of the partial documents will be described. The pseudo random number generator generates pseudo random numbers of at least a quantity corresponding to the number of partial documents (in this example, at least five pseudo random numbers are generated). The generated pseudo random numbers are randomly appended to the partial documents as the partial document IDs.

It is determined whether the pseudo random numbers are in ascending order according to the order of the appearance positions of the partial documents in the electronic document as the result of this appending. The generation of the pseudo random numbers and the appending thereof to the partial documents are repeated until the pseudo random numbers appended to the partial documents are in order of increasing magnitude.

The pseudo random numbers may further be appended to the partial documents after pseudo random numbers of a quantity corresponding to the number of the partial documents have been generated and sorted in advance such that the pseudo random numbers are in ascending order. More specifically, the pseudo random number generator generates the pseudo random numbers of a quantity corresponding to the number of the partial documents (for example, "33, 7, 24, 55, and 51") and the pseudo random numbers are sorted in order of increasing magnitude (in this example, "7, 24, 33, 51, and 55").

The partial document IDs are appended such that the IDs are in ascending order, that is, "7, 24, 33, 51, and 55", starting at the partial document $m_1$ that is located at the leftmost in the electronic document M. Consequently, the partial document IDs "7, 24, 33, 51, and 55" are respectively appended to the partial documents "$m_1, m_2, m_5$" of the electronic document M.

As for the document ID, the pseudo random number generator generates a pseudo random number specific to the electronic document M and this pseudo random number is added to each of the partial documents. More specifically, when the pseudo random number generated by the pseudo random number generator is, for example, "seven", the pseudo random number generated "seven" is appended to each of the partial documents as the document ID.

The reference of the explanation returns to FIG. 4. Hash values for each of the partial documents are calculated and are appended with the document ID and the partial document IDs. In this example, a partial document to which the document ID and the partial document ID has been appended is denoted by "D‖SD$_i$‖m$_i$" (i=1, 2, . . . , 5) and the hash values of the partial documents are denoted by "h$_1$, h$_2$, . . . , h$_5$".

The calculation origin of the hash values may be the partial documents appended with the document ID and the partial document IDs, or may be the partial documents appended with no document ID and no partial document ID.

The hash value corresponds to the above hash value calculated by the calculating unit 303 for each of the components of the electronic document.

Each hash value calculated is appended with the document ID and the partial document ID appended to the partial document of the hash value. An electronic document is created that includes hash values appended with the document ID and the partial document IDs (hereinafter, "document to be signed").

Digital signatures "σ$_1$, σ$_2$, . . . , σ$_5$" for the hash values of the document to be signed, i.e., the hash values appended with the document ID and the partial document IDs are calculated. A digital signature for each of the hash values is appended to the corresponding partial document.

More specifically, for example, the digital signature "σ$_1$" calculated from the hash value "D‖SD$_1$‖h$_1$" appended with the document ID and the partial document ID is appended to the partial document "m$_1$". The digital signature corresponds to the above digital signature created by the creating unit 305 for each of the components of the electronic document.

Finally, an aggregate digital signature a of the digital signatures "σ$_1$, σ$_2$, . . . , σ$_5$" of the partial documents is calculated and appended to the electronic document M. The aggregate digital signature σ corresponds to the above aggregate digital signature calculated by the creating unit 305 for each electronic document.

Figure 5:
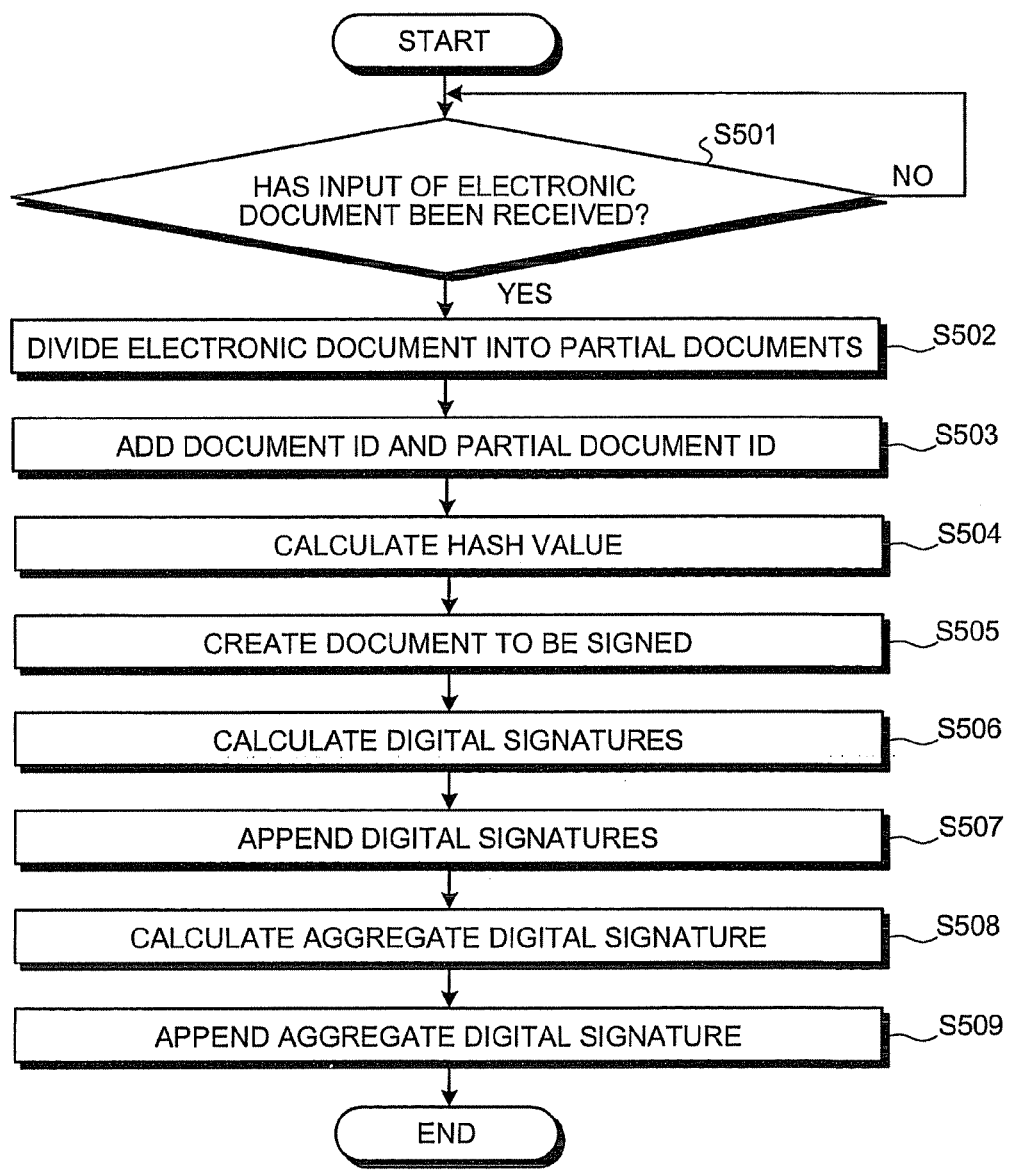
FIG. 5 is a flowchart of the digital signature creating process executed by the document verifying apparatus according to the embodiment.

FIG. 5 is a flowchart of the digital signature creating process executed by the document verifying apparatus according to the embodiment.

As depicted in the flowchart of FIG. 5, the document verifying apparatus determines whether the input unit 301 has received input of an electronic document (step S501). Input of an electronic document is waited for. When the input unit 301 has received the input (step S501: YES), the dividing unit 302 divides the input electronic document into partial documents (step S502).

A document ID and a partial document ID are appended to each of the partial documents (step S503). Thereby, the original document is created. The calculating unit 303 calculates a hash value for each of the partial documents (step S504). The correlating unit 304 correlates the respective hash values of the partial documents with the document IDs and the partial document IDs appended respectively to the partial documents and thereby, a document to be signed is created by replacing the components of the electronic document with the corresponding hash values (step S505).

The creating unit 305 calculates a digital signature for each of the hash values appended with a document ID and a partial document ID (step S506). The appending unit 306 respectively appends the calculated digital signatures to the corresponding partial documents (step S507).

The creating unit 305 calculates an aggregate digital signature of the digital signatures of the partial documents (step S508). The appending unit 306 appends the aggregate digital signature to the electronic document (step S509) and a series of the process according to the flowchart ends. The original document that has been appended with the aggregate digital signature and whose partial documents have been appended with the digital signatures is recorded in the electronic document DB constructed in the recording medium such as the HD 205.

The order of the processes executed at steps S505 to S509 in the flowchart is not limited to that described above. For example, the process of appending the digital signatures to the partial documents and the process of appending the aggregate digital signature to the original document may be executed after the process of calculating the digital signatures of the partial documents and the aggregate digital signature of the original document.

Thus, even when an alteration has been made such as a change in the positions of or a transfer of the partial documents, the electronic document can be processed and retained such that the authenticity of the electronic document after the alteration can be verified.

Based on the partial document IDs allocated to the partial documents according to the order of appearance positions in the electronic document, the digital signatures appended to the partial documents are calculated. Therefore, changes in the positions of the partial documents of an electronic document in which attributes such as "concealed", "deleted", and "forcibly disclosed" have been set may be rendered disabled.

In a first embodiment, partial documents to be concealed may arbitrarily be designated from among the partial documents of an electronic document subjected to the above digital signature creating process. In the first embodiment, the partial documents are concealed by subjecting the designated partial documents to black out processing.

Figure 6:
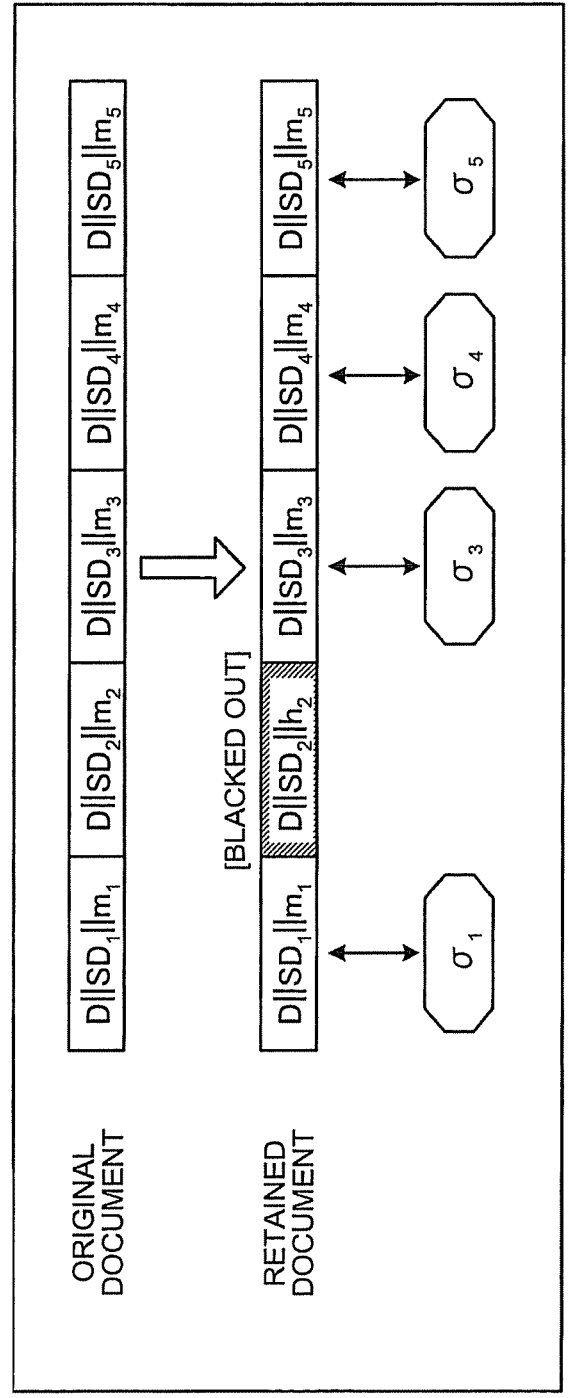
FIG. 6 is a diagram of an overview of a concealing process executed by the document verifying apparatus according to a first embodiment.

FIG. 6 is a diagram of an overview of a concealing process executed by the document verifying apparatus according to the first embodiment. As depicted in FIG. 6, a partial document to be concealed is designated from among the partial documents of the electronic document. The electronic document in this example is an original document whose partial documents have each been appended with a document ID and a partial document ID. The partial document to be concealed corresponds to the component to be concealed that has been designated through the concealment designating unit 307.

More specifically, for example, by operating the keyboard 210 or the mouse 211, a user may arbitrarily designate the partial document to be concealed from the original document displayed on the display 208. In this example, "m$_2$" is designated as the partial document to be concealed from among the partial documents "m$_1$, m$_2$, . . . , m$_5$" of the original document.

The digital signature appended to the partial document designated to be concealed is deleted. In this case, the digital signature σ$_2$ appended to "m$_2$" is deleted. When a digital signature appended to a designated partial document is deleted, the partial document is replaced with the hash value of the partial document.

In this example, the digital signature σ$_2$ appended to "m$_2$" is deleted and "m$_2$" is replaced with "h$_2$". The partial document is concealed by subjecting the partial document to black out processing. In this case, "D‖SD2‖m$_2$" appended with the document ID and the partial document ID is blacked out. The original document whose partial document designated to be concealed has been subjected to black out processing is hereinafter referred to as "retained document".

When plural partial documents to be concealed are designated, a same process is executed. If the digital signature appended to the partial document designated to be concealed is not deleted, the black out processing is not executed. Therefore, even if a partial document to be concealed has been designated, the partial document may not be concealed if the digital signature appended thereto has not been deleted.

Figure 7:
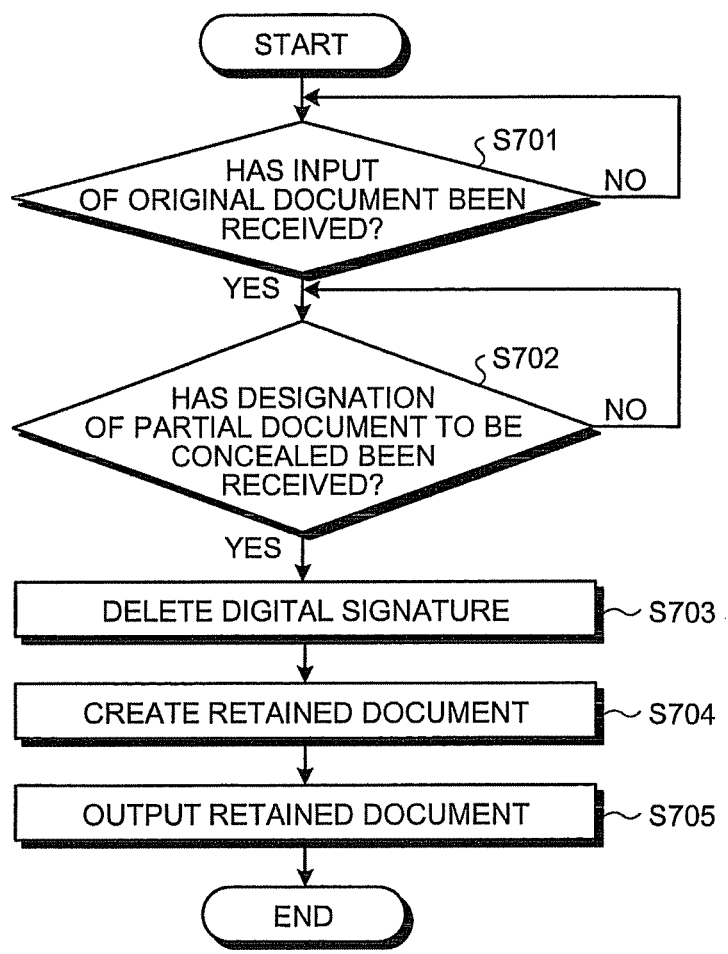
FIG. 7 is a flowchart of a concealing process executed by the document verifying apparatus according to the first embodiment.

FIG. 7 is a flowchart of a concealing process executed by the document verifying apparatus according to the first embodiment. As depicted in FIG. 7, the document verifying apparatus determines whether the apparatus has received input of an original document (step S701).

The input of an original document is waited for. When an original document has been input (step S701: YES), the concealment designating unit 307 determines whether designation of a partial document to be concealed has been received (step S702). Designation of a partial document to be concealed is waited for. When a partial document is designated (step S702: YES), the deleting unit 308 deletes the digital signature appended to the partial document designated (step S703).

The setting unit 309 sets the designated partial document to be concealed and thereby, creates a retained document in which the designated partial document has been blacked out (step S704). The retained document created is output (step S705) and a series of process according to the flowchart ends.

Thereby, the attribute "concealed (blacked out)" may be set in the original document. In this case, even if the partial document blacked out is altered, the retained document may be processed and retained such that the authenticity of the retained document can be verified.

Further, the partial document designated to be concealed may be processed and retained such that the partial document cannot be altered to that of another attribute or to the original thereof. Therefore, in this case, the partial document once blacked out may not afterwards be designated as a partial document to be deleted or to be forcibly disclosed.

Figure 8:
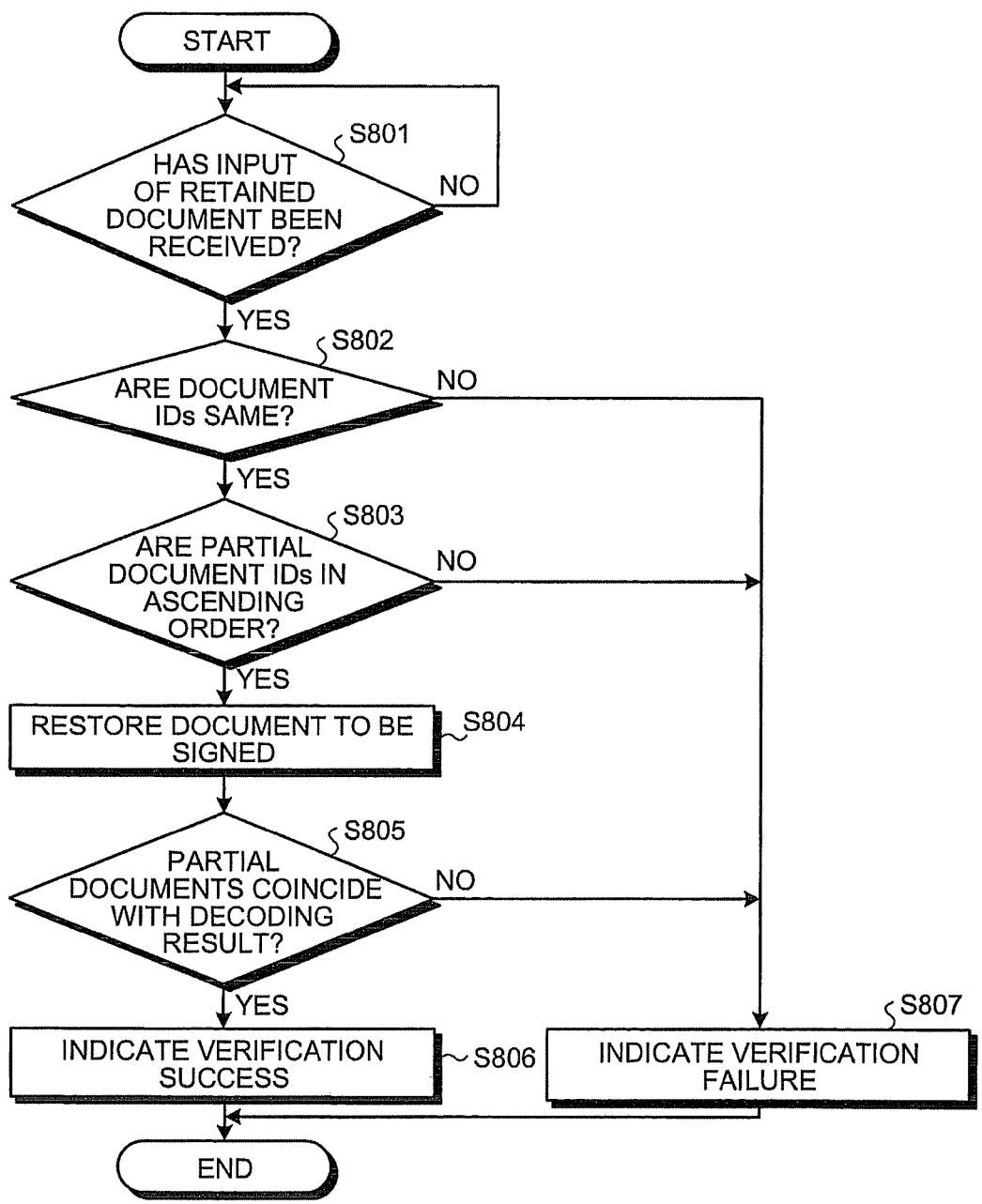
FIG. 8 is a flowchart of an electronic document verifying process executed by the document verifying apparatus according to the first embodiment.

FIG. 8 is a flowchart of an electronic document verifying process executed by the document verifying apparatus according to the first embodiment.

As depicted in FIG. 8, the input unit 301 of the document verifying apparatus determines whether input of a retained document has been received (step S801). The input of a retained document is waited for. When the retained document is input (step S801: YES), the determining unit 311 determines whether all document IDs appended to the partial documents of the retained document have the same value (step S802).

If all the document IDs appended to the partial documents have the same value (step S802: YES), the determining unit 311 determines whether the partial document IDs appended to the partial documents are in ascending order (step S803). At this step, if the partial document IDs appended to the partial documents are in ascending order (step S803: YES), the calculating unit 303 calculates the hash values of the partial documents of the retained document and thereby, restores the document to be signed (step S804).

In this case, the partial document designated to be concealed in the retained document is replaced with the hash value of the partial document and therefore, the hash value thereof is not calculated. Whether a partial document is a partial document designated to be concealed is determined by determining whether the digital signature appended to the partial document has been deleted.

The determining unit 311 determines whether the decoding result of the aggregate digital signature and the document to be signed coincide based on the aggregate digital signature appended to the retained document (step S805). At this step, if the result and the document to be signed coincide (step S805: YES), the output unit 313 outputs a verification result indicating verification success (step S806) and a series of the process according to the flowchart ends.

On the other hand, if the result and the document do not coincide at step S805 (step S805: NO), the output unit 313 outputs a verification result indicating verification failure (step S807) and a series of the process according to the flowchart ends. When the document IDs appended to the partial documents do not have the same value at step S802 (step S802: NO), the output unit 313 outputs a verification result indicating verification failure (step S807) and a series of the process according to the flowchart ends.

If the partial document IDs appended to the partial documents are not in ascending order at step S803 (step S803: NO), the output unit 313 outputs a verification result indicating verification failure (step S807) and a series of the process according to the flowchart ends.

Figure 9:
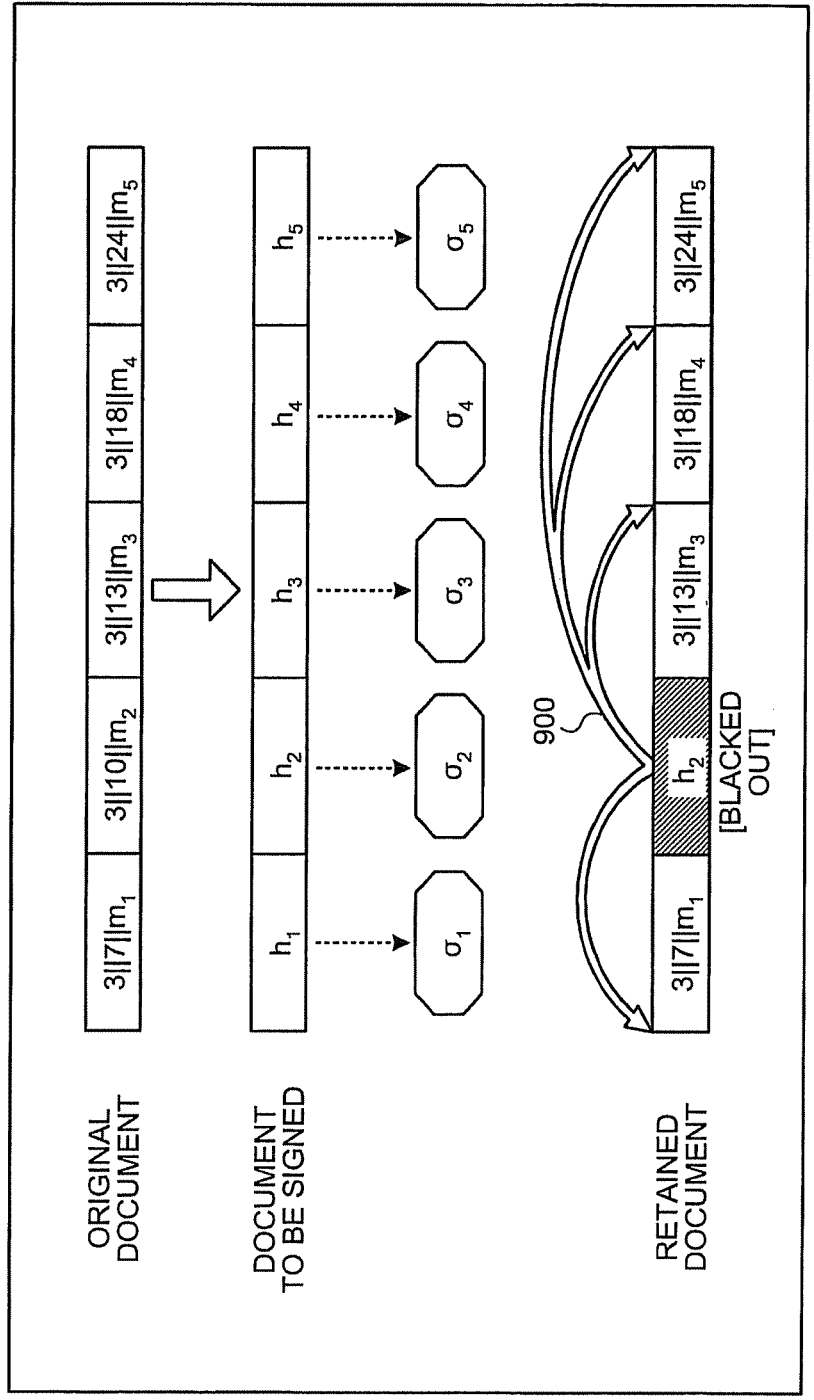
FIG. 9 is a diagram of an exemplary problem of the black out signature technique.

The significance of the digital signature created for each of the hash values appended with the document ID and the partial document ID will be described. FIG. 9 is a diagram of an exemplary problem of the black out signature technique.

As depicted in FIG. 9, the hash values of the partial documents of the original document are calculated and thereby, the document to be signed is created. The digital signatures to be appended to the partial documents are calculated from the hash values of the partial documents.

In this case, the hash value that is the calculation origin of the digital signature is not appended with the document ID and the partial document ID. When a partial document is designated to be concealed, the document ID and the partial document ID of the partial document, that is, sequence information concerning the partial document is lost.

Therefore, when the validity is determined using the digital signature appended to the partial document, though the validity of the content of the partial document may be determined, validity concerning unauthorized alteration such as a change in the positions of or a transfer of the partial document may not be determined because the sequence information is lost.

More specifically, for example, if the partial document "$m_2$" is designated to be concealed, the sequence information for the partial document "$m_2$" is lost. Therefore, if the position of the partial document "$m_2$" that is concealed (blacked out) is changed (indicated by an arrow 900 in FIG. 9), the validity of the retained document cannot be determined. That is, unauthorized changes in position are enabled and therefore, the authenticity of the electronic document cannot be guaranteed.

According to the first embodiment, by appending the document ID and the partial document ID to the hash value that is the calculation origin of the digital signature, the sequence information for a partial document designated to be concealed can be retained and, even if the partial document is altered, the authenticity of the electronic document can be properly verified.

Thus, the authenticity of a retained document to which alteration has been made such as changes in the positions of or a transfer of the partial documents constituting the original document is verifiable and therefore, unauthorized alteration can be prevented. In this case, even if alteration is made to a partial document that is concealed (blacked out), the sequence information for the partial document concealed is retained by the aggregate digital signature and therefore, the authenticity of the partial document concealed is verifiable.

According to the document verifying apparatus of the first embodiment, an attribute "concealed" may be set in the electronic document and, even when an alteration such as changes in the positions of or a transfer of the partial documents constituting the electronic document is made, the authenticity of the electronic document after the alteration is verifiable.

According to a second embodiment, a partial document to be concealed and another partial document to be forcibly disclosed may be arbitrarily designated from among the partial documents of the original document. The concealing process of the document verifying apparatus according to the second embodiment is same as the concealing process of the document verifying apparatus according to the first embodiment and the description therefor is omitted.

Figure 10:
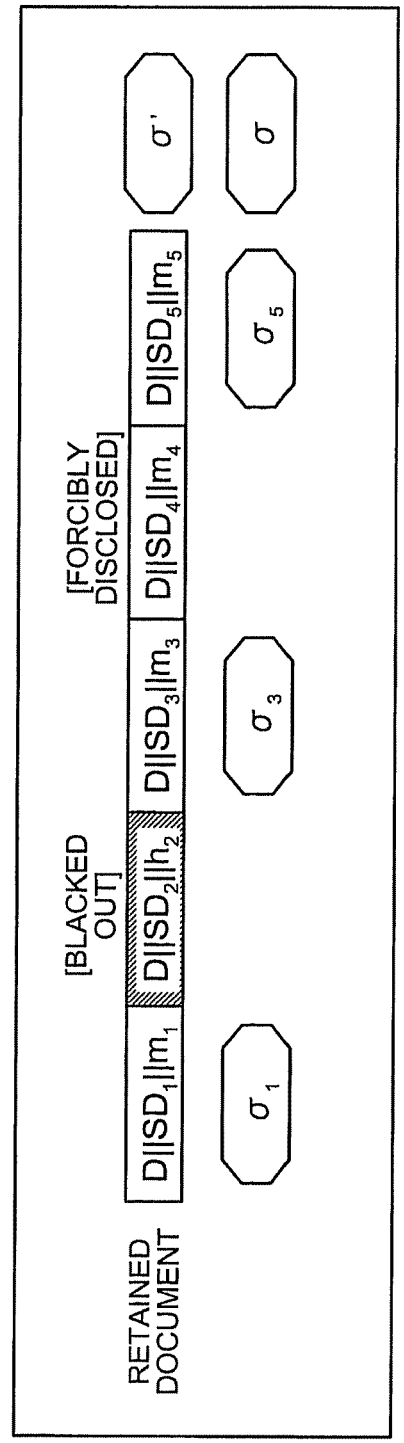
FIG. 10 is a diagram of an overview of a forcibly disclosing process executed by the document verifying apparatus according to a second embodiment.

FIG. 10 is a diagram of an overview of a forcibly disclosing process executed by the document verifying apparatus according to the second embodiment. As depicted in FIG. 10, a partial document to be forcibly disclosed is designated from among the partial documents of the original document. The partial document to be forcibly disclosed corresponds to the component to be forcibly disclosed that is designated through the forcible-disclosure designating unit 315.

In this example, "$m_4$" is designated as a partial document to be forcibly disclosed from among the partial documents "$m_1$, $m_2, \ldots, m_5$" of the original document. "$m_2$" is designated as a partial document to be concealed from among the partial documents "$m_1, m_2, \ldots, m_5$" of the original document and the digital signature $\sigma_2$ appended to this partial document is deleted.

The digital signature appended to the partial document designated to be forcibly disclosed is deleted and the digital signature is further deleted from the aggregate digital signature appended to the original document. In this case, a forcible-disclosure aggregate digital signature having aggregated therein the digital signatures appended to the partial documents designated to be forcibly disclosed is calculated and appended to the retained document.

More specifically, the forcible-disclosure aggregate digital signature having aggregated therein the digital signatures appended to partial documents designated to be partial documents to be forcibly disclosed is created by the creating unit 305. In this case, the digital signature $\sigma_4$ appended to "$m_4$" is deleted and the digital signature $\sigma_4$ is deleted from the aggregate digital signature $\sigma$.

A forcible-disclosure aggregate digital signature $\sigma'$ is created that includes the digital signature $\sigma_4$ appended to "$m_4$" to be forcibly disclosed. The forcible-disclosure aggregate digital signature created is appended to the retained document.

Figure 11:
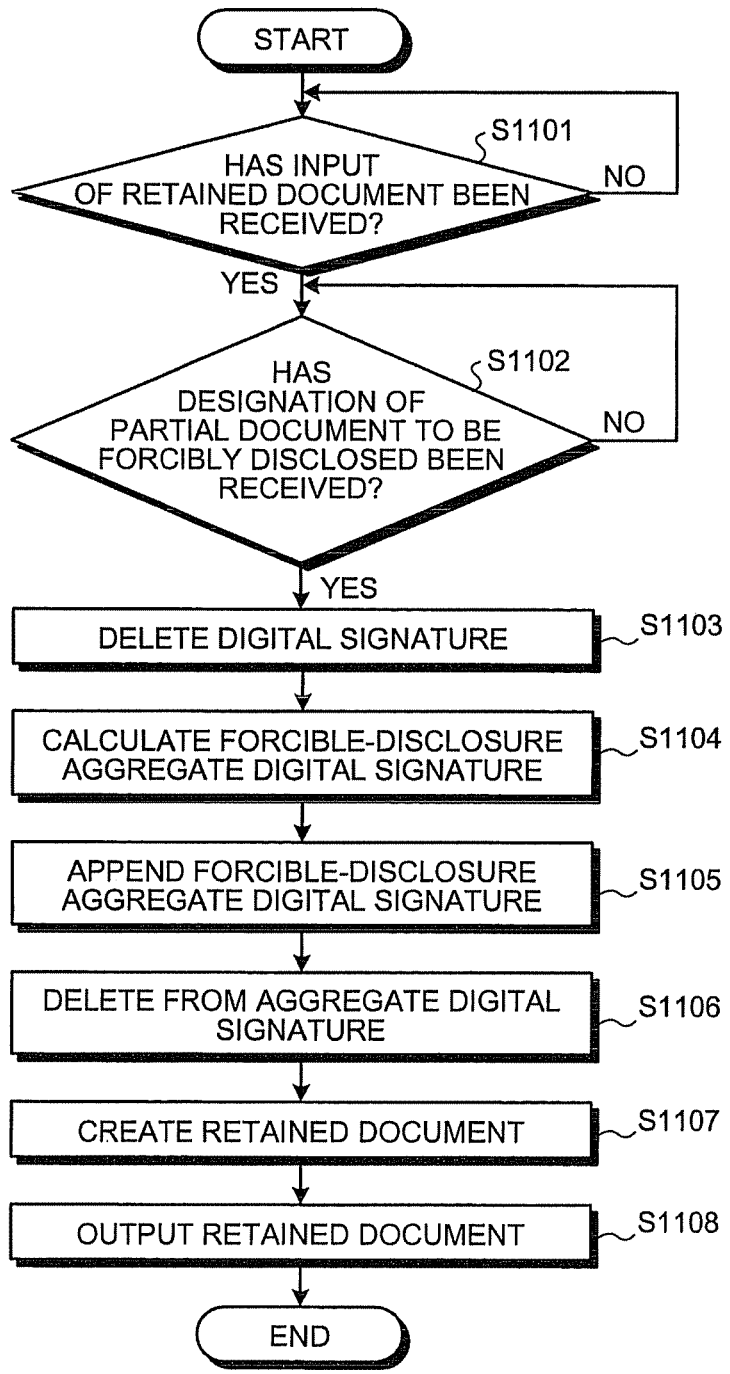
FIG. 11 is a flowchart of a forcible disclosure process executed by the document verifying apparatus according to the second embodiment.

FIG. 11 is a flowchart of a forcible disclosure process executed by the document verifying apparatus according to the second embodiment. As depicted in FIG. 11, the input unit 301 of the document verifying apparatus determines whether input of an original document has been received (step S1101).

The input of an original document is waited for. When an original document is input (step S1101: YES), the forcible-disclosure designating unit 315 determines whether designation of a partial document to be forcibly disclosed has been received (step S1102).

Designation of a partial document to be forcibly disclosed is waited for. When a partial document is designated (step S1102: YES), the deleting unit 308 deletes the digital signature appended to the partial document designated (step S1103).

The creating unit 305 calculates a forcible-disclosure aggregate digital signature including the digital signature appended to the partial document designated (step S1104) and the appending unit 306 appends the forcible-disclosure aggregate digital signature to the original document input at step S1101 (step S1105).

The deleting unit 308 deletes from the aggregate digital signature appended to the original document, the digital signature appended to the partial document designated (step S1106). The setting unit 309 sets the designated partial document to be forcibly disclosed and thereby, creates a retained document having the partial document designated forcibly disclosed (step S1107).

The retained document created is output (step S1108) and a series of process according to the flowchart ends.

Thereby, the attributes "concealed" and "forcibly disclosed" may be set in the original document. In this case, even if alteration has been made to the partial documents whose attributes are set, the retained document may be processed and retained such that the authenticity of the retained document is verifiable.

Further, the partial document designated to be forcibly disclosed may be processed and retained such that the partial document cannot be altered to that of another attribute or to the original thereof. Therefore, the partial document once forcibly disclosed may not afterwards be designated as a partial document to be blacked out or to be deleted.

Figure 12:
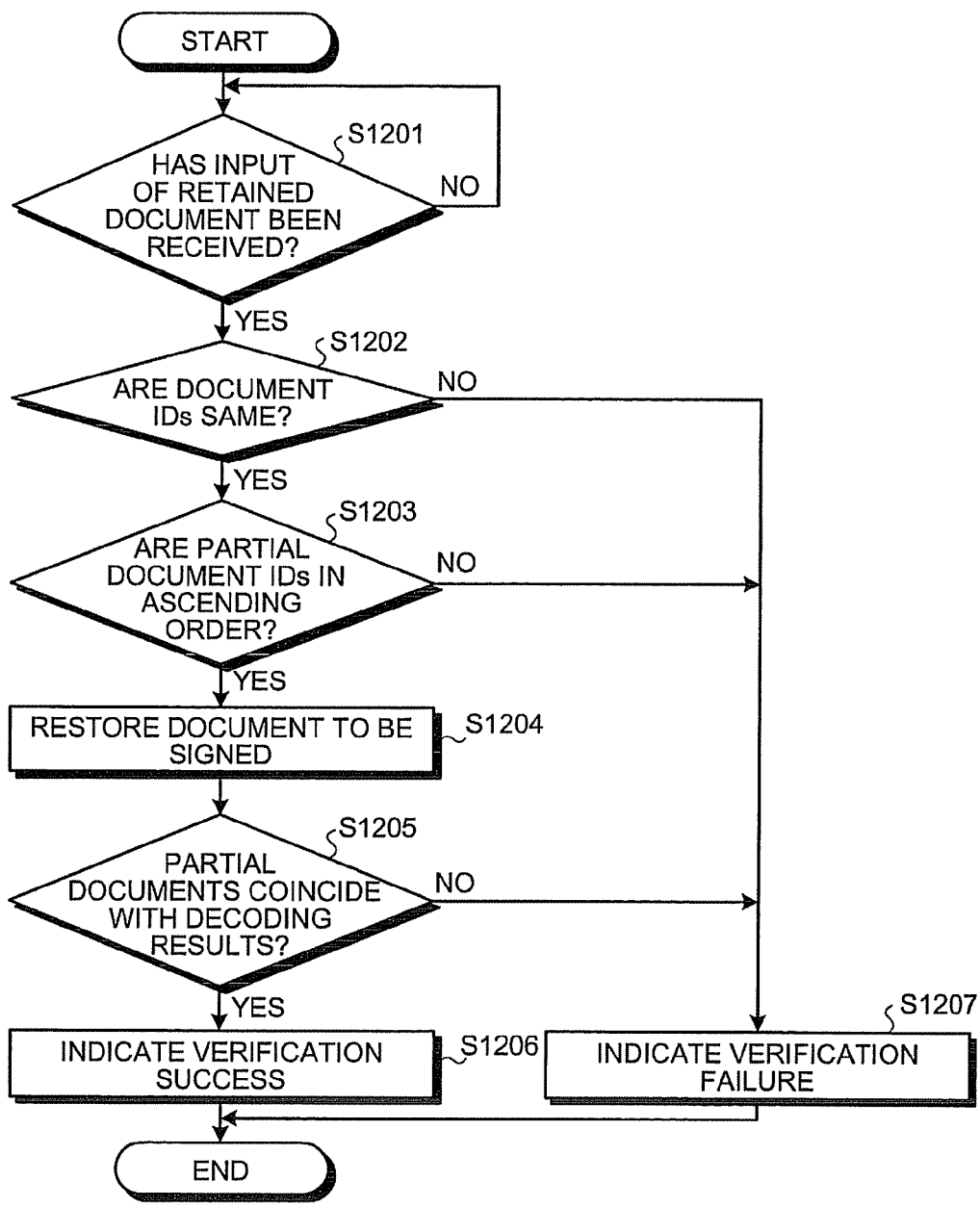
FIG. 12 is a flowchart of an electronic document verifying process executed by the document verifying apparatus according to the second embodiment.

FIG. 12 is a flowchart of an electronic document verifying process executed by the document verifying apparatus according to the second embodiment.

As depicted in FIG. 12, the input unit 301 of the document verifying apparatus determines whether input of a retained document has been received (step S1201). The input of a retained document is waited for. When the retained document is input (step S1201: YES), the determining unit 311 determines whether all document IDs appended to the partial documents of the retained document have the same value (step S1202).

If all the document IDs appended to the partial documents have the same value (step S1202: YES), the determining unit 311 determines whether the partial document IDs appended to the partial documents are in ascending order (step S1203).

At this step, if the partial document IDs appended to the partial documents are in ascending order (step S1203: YES), the calculating unit 303 calculates the hash values of the partial documents of the retained document and thereby, restores the document to be signed (step S1204).

The determining unit 311 determines whether the decoding results of the aggregate digital signature and the forcible-disclosure aggregate digital signature coincide with the document to be signed based on the aggregate digital signature appended to the retained document and the forcible-disclosure aggregate digital signature (step S1205).

More specifically, it is determined whether the partial documents excluding the partial document to be forcibly disclosed coincide with the decoding result of the aggregate digital signature and it is determined whether the partial document to be forcibly disclosed coincide with the decoding result of the forcible-disclosure aggregate digital signature. At this step, if the partial documents coincide with the results (step S1205: YES), the output unit 313 outputs a verification result indicating verification success (step S1206) and a series of the process according to the flowchart ends.

On the other hand, if the results and the partial documents do not coincide at step S1205 (step S1205: NO), the output unit 313 outputs a verification result indicating verification failure (step S1207) and a series of the process according to the flowchart ends. When the document IDs appended to the partial documents do not have the same value at step S1202 (step S1202: NO), the output unit 313 outputs a verification result indicating verification failure (step S1207) and a series of the process according to the flowchart ends.

If the partial document IDs appended to the partial documents are not in ascending order at step S1203 (step S1203: NO), the output unit 313 outputs a verification result indicating verification failure (step S1207) and a series of the process according to the flowchart ends.

Thus, the authenticity of a retained document to which alteration has been made such as changes in the positions of or a transfer of the partial documents constituting the original document is verifiable and therefore, unauthorized alteration can be prevented. In this case, even if alteration is made to a partial document whose attribute has been set, the sequence information for the partial document is retained by the aggregate digital signature and therefore, the authenticity of the partial document concealed is verifiable.

According to the document verifying apparatus of the second embodiment, attributes "concealed" and "forcibly disclosed" may be set in the electronic document and, even when an alteration such as changes in the positions of or a transfer of the partial documents constituting the electronic document is made, the authenticity of the electronic document after the alteration is verifiable.

According to a third embodiment, a partial document to be concealed and another partial document to be deleted may be arbitrarily designated from among the partial documents of the original document.

The concealing process of the document verifying apparatus according to a third embodiment omits the deletion of the digital signature of the partial document to be concealed at step S703 of the concealing process executed by the document verifying apparatus according to the first embodiment. Explanation of the concealing process executed by the document verifying apparatus according to the third embodiment is omitted.

Figure 13:
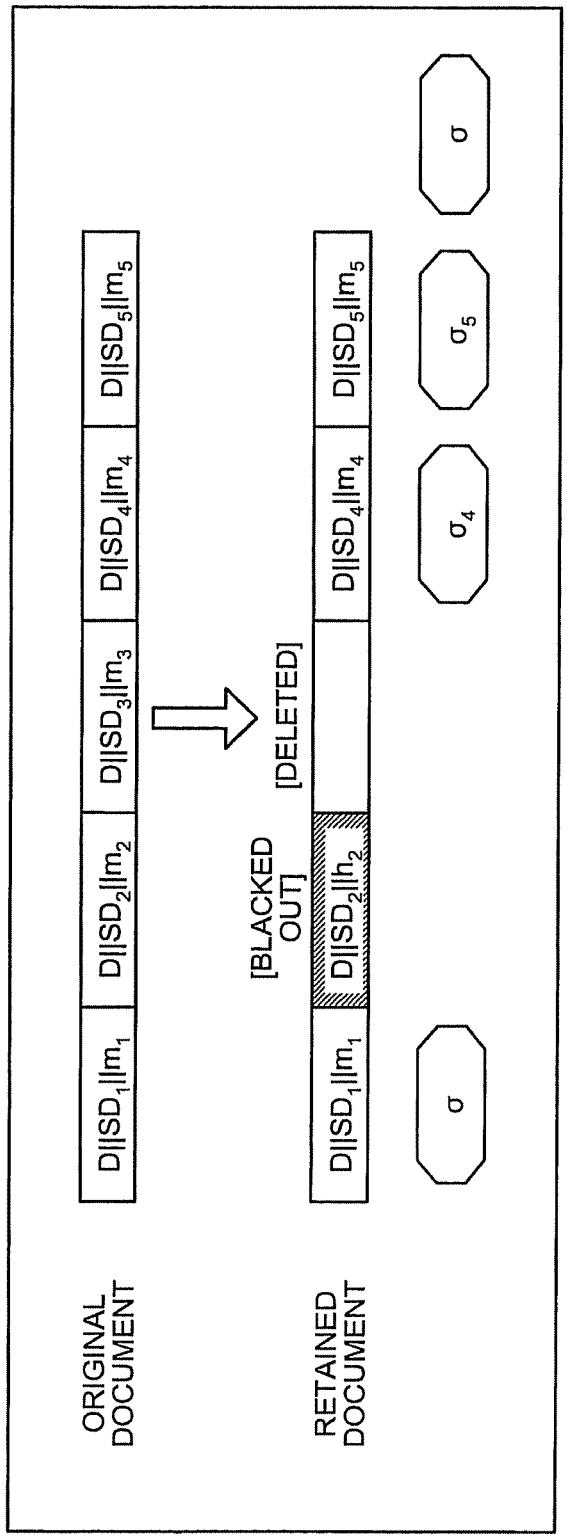
FIG. 13 is a diagram of an overview of a deleting process executed by the document verifying apparatus according to a third embodiment.

FIG. 13 is a diagram of an overview of a deleting process executed by the document verifying apparatus according to the third embodiment. As depicted in FIG. 13, a partial document to be deleted is designated from among the partial documents of the original document. In this case, "$m_3$" is designated as the partial document to be deleted from among the partial documents "$m_1, m_2, \ldots, m_5$" that constitute the original document.

"$m_2$" has been designated as a partial document to be concealed from among the partial documents "$m_1, m_2, \ldots, m_5$" that constitute the original document and the digital signature $\sigma_2$ appended to the partial document has been deleted.

The partial document designated is deleted and the digital signature appended to the partial document is deleted. The digital signature appended to the partial document designated is deleted from the aggregate digital signature appended to the original document. In this case, "$m_3$" is deleted and the digital signature $\sigma_3$ appended to "$m_3$" is deleted. The digital signature $\sigma_3$ appended to "$m_3$" is deleted from the aggregate digital signature $\sigma$.

Figure 14:
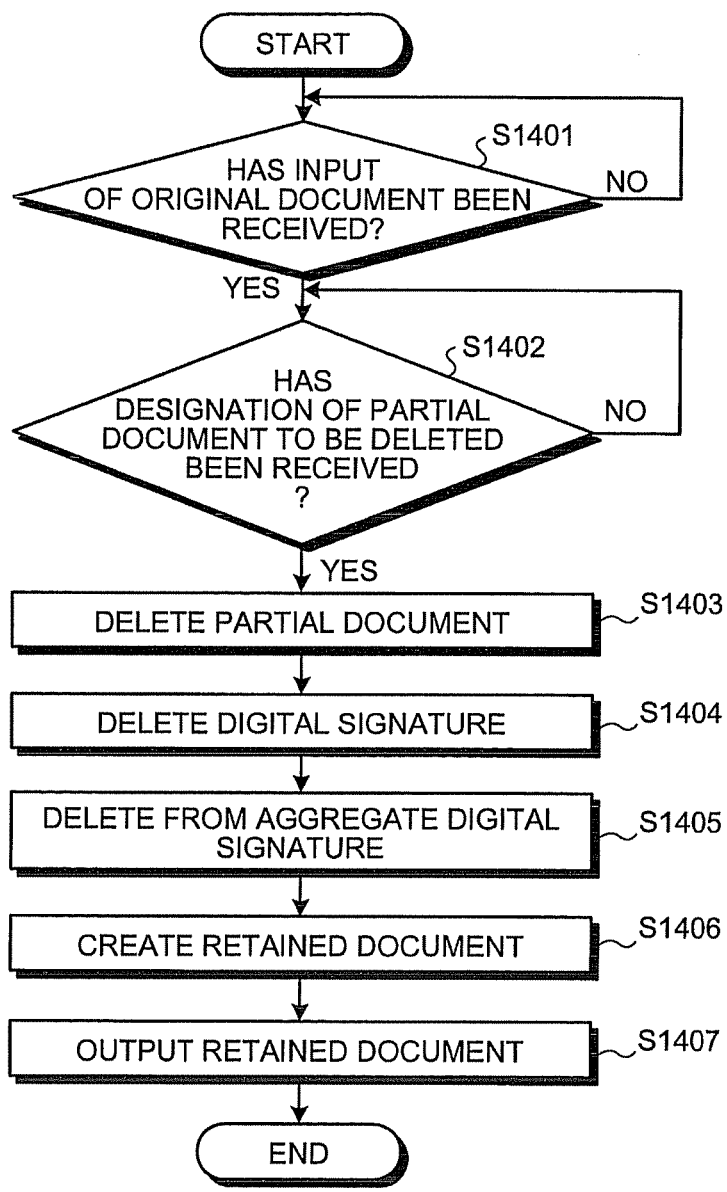
FIG. 14 is a flowchart of a forcible disclosure process executed by the document verifying apparatus according to the third embodiment.

FIG. 14 is a flowchart of a forcible disclosure process executed by the document verifying apparatus according to the third embodiment. As depicted in FIG. 14, the input unit 301 of the document verifying apparatus determines whether input of an original document has been received (step S1401).

At this step, the original document is waited for to be input. When the original document is input (step S1401: YES), the deletion designating unit 314 determines whether designation of a partial document to be deleted has been received (step S1402). Designation of a partial document to be deleted is waited for. When a partial document is designated (step S1402: YES), the deleting unit 308 deletes the partial document designated (step S1403) and the digital signature appended to the partial document designated is deleted (step S1404).

The deleting unit 308 deletes from the aggregate digital signature appended to the original document, the digital signature appended to the partial document designated (step S1405). The setting unit 309 sets the partial document designated to be a partial document to be deleted and, thereby, creates a retained document having a designated partial document that is deleted (step S1406). The retained document created is output (step S1407) and a series of process according to the flowchart ends.

The order of the processes at steps S1404 to 1405 is not limited to that described above. For example, the process of deleting the partial document and the digital signature appended to the partial document may be executed after the process of deleting from the aggregate digital signature appended to the original document, the digital signature appended to the partial document designated.

Thereby, the attributes "concealed" and "deleted" may be set in the original document. In this case, even when any alteration has been made to the partial documents whose attributes are set, the retained document may be processed and retained such that the authenticity of the retained document is verifiable.

The partial document designated to be deleted may also be processed and retained such that the partial document is cannot be altered to that of another attribute or to the original thereof. Therefore, the partial document once deleted may not afterwards be designated as a partial document to be blacked out or to be forcibly disclosed.

The electronic document verifying process executed by the document verifying apparatus according to the third embodiment is substantially identical to the electronic document verifying process executed by the document verifying apparatus according to the first embodiment and, therefore, explanation therefor is omitted.

Thus, the authenticity of a retained document to which alteration has been made such as changes in the positions of or a transfer of the partial documents constituting the original document is verifiable and therefore, unauthorized alteration can be prevented. In this case, even if alteration is made to a partial document having a set attribute, the sequence information for the partial document is retained by the aggregate digital signature and therefore, the authenticity of the partial document concealed is verifiable.

According to the document verifying apparatus of the third embodiment, attributes "concealed" and "deleted" may be set in the electronic document and, even when an alteration such as changes in the positions of or a transfer of the partial documents constituting the electronic document is made, the authenticity of the electronic document after the alteration is verifiable.

According to a fourth embodiment, partial documents to be concealed, deleted, and forcibly disclosed, respectively, may be arbitrarily designated from among the partial documents of the original document. In other words, attributes of the electronic document may be arbitrarily designated as "concealed", "deleted", and "forcibly disclosed".

In the fourth embodiment, the three attributes above can be designated by an appending of a first and a second digital signature for each of the partial documents constituting the electronic document. The first and the second digital signatures are digital signatures that are different from each other and the calculation scheme thereof is arbitrary.

For example, the first and the second digital signatures may be calculated from one original document by employing two calculation schemes each having an algorithm that is different from the counterpart algorithm. Alternatively, the first and the second digital signatures that are different from each other may be calculated by creating two original documents each appended with a document ID and partial document IDs that are different from those of the counterpart original document.

Figure 15:
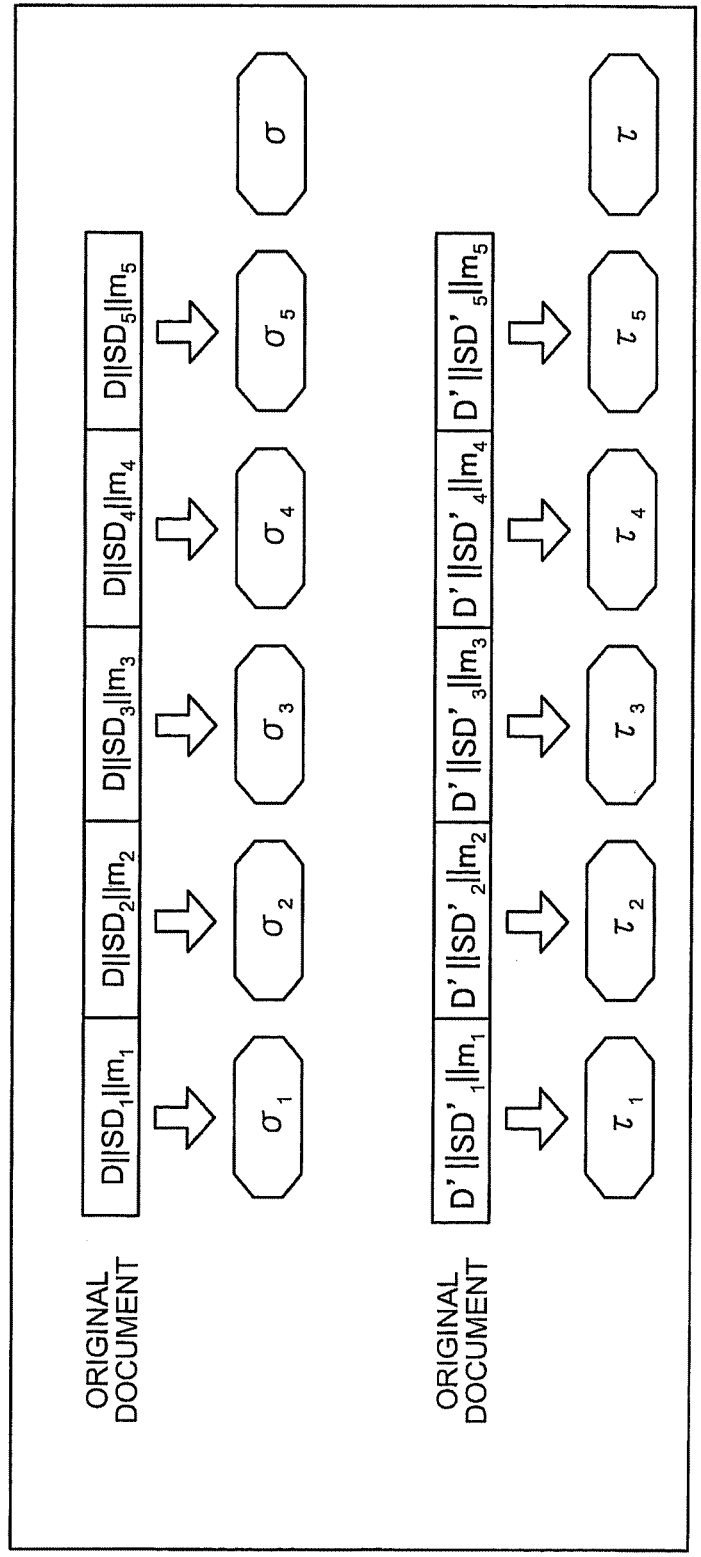
FIG. 15 is a diagram of an overview of a digital signature creating process executed by the document verifying apparatus according to a fourth embodiment.

An example where a first digital signature and a second digital signature that are different from each other are calculated using one calculation scheme by creating two original documents will be described. FIG. 15 is a diagram of an overview of a digital signature creating process executed by the document verifying apparatus according to the fourth embodiment. Explanation of processes that are identical to those of the digital signature creating process depicted in FIG. 4 is omitted.

As depicted in FIG. 15, a first original document and a second original document that are different from each other are created by repeating twice a process of appending an unpredictable document ID and an unpredictable partial document ID to each of the partial documents.

In the explanation, with respect to the first original document, the document ID appended thereto is denoted by "D" and the partial document ID appended thereto is denoted by "$SD_i$ (i=1 to 5)"; with respect to the second original document, the document ID appended thereto is denoted by "D'" and the partial document ID appended thereto is denoted by "$SD'_i$ (i=1 to 5)".

When the document IDs "D" and "D'" are different from each other, the partial document IDs "$SD_i$ (i=1 to 5)" and "$SD'_i$ (i=1 to 5)" may be same. When the partial document IDs "$SD_i$ (i=1 to 5)" and "$SD'_i$ (i=1 to 5)" are different from each other, the document IDs "D" and "D'" may be same.

The document IDs and the partial document IDs respectively appended to the partial documents of the first and the second original documents are respectively appended to the hash values of the partial documents of the first and the second original documents according to partial document and thereby, a first document and a second document to be signed are created.

The first digital signatures "$\sigma_1, \sigma_2, \ldots, \sigma_5$" are calculated for the hash values constituting the first document to be signed, i.e., the hash values respectively appended with a document ID and a partial document ID, and the second digital signatures "$\tau_1, \tau_2, \ldots, \tau_5$" are calculated for the hash values constituting the second document to be signed, i.e., the hash values respectively appended with a document ID and a partial document ID.

The first and the second digital signatures for the hash values constituting the first and the second documents to be signed are respectively appended to corresponding partial documents. More specifically, for example, the first and the second digital signatures "$\sigma_1$" and "$\tau_1$" respectively calculated from the hash values "$D\|SD_1\|h_1$" and "$D'\|SD'_1\|h_1$" each appended with a document ID and a partial document ID are appended to the partial document "$m_1$".

A first aggregate digital signature $\sigma$ of the first digital signatures "$\sigma_1, \sigma_2, \ldots, \sigma_5$" of the partial documents is calculated and a second aggregate digital signature $\tau$ of the second digital signatures "$\tau_1, \tau_2, \ldots, \tau_5$" of the partial documents is calculated, and these aggregate digital signatures are appended to the electronic document M not depicted. Although the first aggregate digital signature having the first digital signatures aggregated therein and the second aggregate digital signature having the second digital signatures aggregated therein are calculated in the above, any one of the above two may be calculated.

FIG. 16 is a flowchart of a digital signature creating process executed by the document verifying apparatus according the fourth embodiment.

As depicted in the flowchart of FIG. 16, the document verifying apparatus determines using the input unit 301 whether input of the electronic document has been received (step S1601). The input of an electronic document is waited for. When the input is received (step S1601: YES), the dividing unit 302 divides the electronic document input (step S1602).

By executing the original document creating process (step S1603), a first original document and a second original document that respectively have partial documents appended with a document ID and a partial document ID are created.

The calculating unit 303 calculates a hash value for each of the partial documents (step S1604). The correlating unit 304 correlates the hash values of the partial documents with the document IDs and the partial document IDs appended to the partial documents constituting the first and the second original documents created at step S1603 and thereby, creates a first document to be signed and a second document to be signed that are formed by replacing each of the partial documents constituting the electronic document with the corresponding hash value (step S1605).

The creating unit 305 calculates a first digital signature for each of the hash values appended with the document ID and the partial document ID and constituting the first document to be signed, and calculates a second digital signature for each of the hash values appended with the document ID and the partial document ID and constituting the second document to be signed (step S1606).

The appending unit 306 appends the first and the second digital signatures calculated to corresponding partial documents (step S1607). A first aggregate digital signature of the first digital signatures for the partial documents is calculated and a second aggregate digital signature of the second digital signatures for the partial documents is calculated (step S1608).

The appending unit 306 appends the aggregate digital signatures to the electronic documents, respectively (step S1609) and a series of the process according to the flowchart ends. The first original document that is appended with the first aggregate digital signature and whose partial documents are each appended with a first digital signature and the second original document that is appended with the second aggregate digital signature and whose partial documents are each appended with a second digital signature are recorded in the electronic document DB constructed in the recording medium such as the HD 205.

Thus, even when an alteration such as a change in the position of or a transfer of the partial documents constituting the electronic document has been made, the electronic document may be processed and retained such that the authenticity of the electronic document after the alteration is verifiable. By appending the first and the second digital signatures to each of the components, the attributes "concealed", "deleted", and "forcibly disclosed" may be unchangeably set for each of the components.

Based on the partial document IDs allocated to the partial documents according to appearance positions in the electronic document, the first and the second digital signatures to be appended respectively to the partial documents are calculated. Therefore, the sequence information of the partial documents for which the attribute "concealed", "deleted", or "forcibly disclosed" has been set may be retained and thus, even when an alteration has been made to the partial documents for which an attribute has been set, the authenticity of the electronic document after the alteration is verifiable.

FIG. 17 is a diagram of an overview of an editing process executed by the document verifying apparatus according to the fourth embodiment.

An example where partial documents are designated to be concealed, deleted, and forcibly disclosed in this order will be described. However, the order of the designated attributes is arbitrary and is not limited to the above.

As depicted in FIG. 17, a partial document to be concealed is designated from among the partial documents of the original document (only the first original document among the first and the second original documents is depicted). In this example, "$m_2$" is designated as the partial document to be concealed (blacked out) from among the partial documents "$m_1, m_2, \ldots, m_5$" constituting the original document.

Any one of the first digital signature $\sigma_2$ and the second digital signature $\tau_2$ appended to the partial document designated to be concealed (in this example, the second digital signature $\tau_2$) is deleted. Here, the partial document "$m_2$" designated to be concealed is replaced with the hash value "$h_2$."

A partial document to be deleted is designated from among the partial documents of the original document. In this example, "$m_3$" is designated as the partial document to be deleted from the partial documents "$m_1, m_2, \ldots, m_5$" constituting the original document.

The partial document designated to be deleted is deleted, and the first digital signature $\sigma_3$ and the second digital signature $\tau_3$ appended to this electronic document are deleted. The first digital signature $\sigma_3$ and the second digital signature $\tau_3$ appended to the partial document designated to be deleted are deleted from the first digital signature $\sigma$ and the second digital signature $\tau$ appended to the original document.

The partial document to be forcibly disclosed is designated from among the partial documents of the original document. In this case, "$m_4$" is designated as the partial document to be forcibly disclosed from among the partial documents "$m_1, m_2, \ldots, m_5$" constituting the original document.

The 4 and the second digital signature□first digital signature $\tau_4$ appended to the partial document are deleted. Thereby, a retained document obtained by executing the concealing process, the deleting process, and the forcibly disclosing process with respect to the original document is created.

FIG. 18 is a flowchart of the editing process executed by the document verifying apparatus according to the fourth embodiment.

As depicted in FIG. 18, the input unit 301 of the document verifying apparatus determines whether input of the original documents has been received (step S1801). The original documents input in this example are the above first and second original documents.

The input of original documents is waited for. When the original documents are input (step S1801: YES), the concealment designating unit 307 determines whether designation of a partial document to be concealed has been received (step S1802). If designation of a partial document to be concealed has been received (step S1802: YES), the deleting unit 308 deletes the second digital signature appended to the partial document designated (step S1803).

The deletion designating unit 314 determines whether designation of a partial document to be deleted has been received (step S1804). If designation of a partial document to be deleted has been received (step S1804: YES), the deleting unit 308 deletes the partial document designated (step S1805) and deletes the first and the second digital signatures appended to the partial document designated (step S1806).

The first and the second digital signatures appended to the partial document designated are deleted respectively from the first and the second aggregate digital signatures appended to the original documents input at step S1801 (step S1807).

The forcible-disclosure designating unit 315 determines whether designation of a partial document to be forcibly disclosed has been received (step S1808). If designation of a partial document to be forcibly disclosed has been received (step S1808: YES), the deleting unit 308 deletes the first and the second digital signatures appended to the partial document designated (step S1809).

The setting unit 309 sets the designated partial documents as those to be concealed, deleted, and forcibly disclosed and thereby, the retained document is created (step S1810). The retained document created is output (step S1811) and a series of the process according to the flowchart ends.

On the other hand, when designation of the partial document to be concealed is not received at step S1802 (step S1802: NO), the process proceeds to step S1804. When designation of a partial document to be deleted is not received at step S1804 (step S1804: NO), the process proceeds to step S1808. When designation of a partial document to be forcibly disclosed is not received at step S1808 (step S1808: NO), the process proceeds to step S1810.

An example where the editing processes are executed in order of the designation of the partial document to be concealed, the designation of the partial document to be deleted, and the designation of the partial document to be forcibly disclosed has been described. However, the order is not limited to the above. For example, the partial document to be deleted may be designated and thereafter, the partial document to be concealed may be designated and the partial document to be forcibly disclosed may be designated.

As described, the attributes "concealed", "deleted", and "forcibly disclosed" may be set in the original document. In this case, even when an alteration has been made to a blacked out partial document, the retained document may be processed and retained such that the authenticity of the retained document is verifiable.

A partial document whose attribute has been set to be of any of the attributes above may be processed and retained such that the partial document cannot be altered to that of another attribute or to the original thereof. Therefore, the partial document set to be a partial document of any of the attributes may not afterwards be set as a partial document of another attribute.

More specifically, for example, the attribute of a partial document is cannot be changed from "concealed" to "deleted". Further, the attribute of the partial document cannot be changed from "concealed" to "forcibly disclosed". The attribute of the partial document cannot be changed from "concealed" to "the original partial document".

Similarly, for example, the attribute of a partial document is cannot be changed from "deleted" to "concealed". Further, the attribute of the partial document cannot be changed from "deleted" to "forcibly disclosed". The attribute of the partial document cannot be changed from "deleted" to "the original partial document".

Similarly, for example, the attribute of a partial document is cannot be changed from "forcibly disclosed" to "concealed". Further, the attribute of the partial document cannot be changed from "forcibly disclosed" to "deleted". The attribute of the partial document cannot be changed from "forcibly disclosed" to "the original partial document".

The electronic document verifying process executed by the document verifying apparatus according to the fourth embodiment is substantially identical to the electronic document verifying process executed by the document verifying apparatus according to the first embodiment and therefore, explanation therefor is omitted.

Thus, the authenticity of a retained document to which alteration has been made such as changes in the positions of or a transfer of the partial documents constituting the original document is verifiable and therefore, unauthorized alteration can be prevented. In this case, even if alteration is made to a partial document having a set attribute, the sequence information for the partial document is retained by the aggregate digital signature and therefore, the authenticity of the partial document concealed is verifiable.

According to the document verifying apparatus of the fourth embodiment, attributes "concealed", "deleted", and "forcibly disclosed" may be set in the electronic document and, even when an alteration such as changes in the positions of or a transfer of the partial documents constituting the electronic document is made, the authenticity of the electronic document after the alteration is verifiable.

As described, plural attributes can be set for an electronic document and thereby, achieving improved usability and enabling the authenticity of an altered electronic document to be verified.

The document verifying method explained in the present embodiment can be implemented by a computer, such as a personal computer and a workstation, executing a program that is prepared in advance. The program is recorded on a computer-readable recording medium such as a hard disk, a flexible disk, a CD-ROM, an MO, and a DVD, and is executed by being read out from the recording medium by a computer. The program can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable recording medium storing therein a document verifying program that causes a computer to execute:
   receiving input of an electronic document;
   dividing the electronic document received at the receiving into arbitrary components;
   calculating a hash value for each of the components obtained at the dividing;
   correlating, for each component among the components, the hash value calculated for the component at the calculating and a random number allocated to the component according to an appearance position of the component in the electronic document;
   creating for each component and based on the hash value and the random number correlated for the component at the correlating, a first digital signature and a second digital signature that are different from each other;
   appending to each component, the first digital signature and the second digital signature created for the component at the creating;
   receiving designation of a component to be concealed, the component being among the components;
   deleting the second digital signature appended to the component to be concealed designated in the designation received at the receiving designation;
   setting the electronic document to be an electronic document having a component that is to be concealed, by correlating the electronic document and the hash value of the component for which the second digital signature is deleted at the deleting;
   receiving input of the electronic document set at the setting;
   replacing each component of the electronic document set at the setting and received at the receiving, with a hash value calculated for the component, by calculating hash values for the components constituting the electronic document set at the setting and received at the receiving;
   determining validity of the hash values replacing the components at the replacing and validity of random numbers allocated to the hash values, based on the aggregate digital signature appended to the electronic document;
   verifying authenticity of the electronic document based on a determination result obtained at the determining; and
   outputting a verification result obtained at the verifying, wherein
   the correlating includes correlating for each component, the hash value and the random number correlated for the component at the correlating with a common random number allocated to and common to all the components,
   the creating includes creating the first digital signature and the second digital signature for each component, based on the common random number, the hash value and the random number that are correlated for the component at the correlating,
   the creating includes creating an aggregate digital signature of first digital signatures or second digital signatures created respectively for the components at the creating,
   the appending includes appending the aggregate digital signature created at the creating to the electronic document, and
   the determining includes determining, for each component among the components constituting the electronic document set at the setting, whether the random number allocated to the component accords to the appearance position of the component in the electronic document set at the setting and received at the receiving.

2. The non-transitory computer-readable recording medium according to claim 1, wherein
   the determining further includes determining validity of a common random number allocated to the hash values replacing the components at the replacing, based on the aggregate digital signature appended to the electronic document.

3. The non-transitory computer-readable recording medium according to claim 1, wherein
   the determining further includes determining whether the common random number allocated to the components is common to all the components constituting the electronic document set at the setting and received at the receiving.

4. The non-transitory computer-readable recording medium according to claim 1, the document verifying program further causing the computer to execute receiving designation of a component to be deleted, the component being among the components, wherein
   the deleting includes deleting the first digital signature and the second digital signature appended to the component to be deleted as designated in the designation received at the receiving designation of a component to be deleted.

5. The non-transitory computer-readable recording medium according to claim 4, wherein
   the deleting includes deleting from the aggregate digital signature appended to the electronic document, the first digital signature or the second digital signature appended to the component to be deleted.

6. The non-transitory computer-readable recording medium according to claim 4, wherein
   the setting includes setting the electronic document to be an electronic document having a component that is to be deleted and for which the first digital signature and the second digital signature are deleted at the deleting.

7. The non-transitory computer-readable recording medium according to claim 1, the document verifying program further causing the computer to execute receiving designation of a component to be forcibly disclosed, the component being among the components, wherein
the deleting includes deleting the first digital signature and the second digital signature appended to the component to be forcibly disclosed as designated in the designation received at the receiving designation of a component to be deleted.

8. The non-transitory computer-readable recording medium according to claim 7, wherein
the setting includes setting the electronic document to be an electronic document having a component that is to be forcibly disclosed and for which the first digital signature and the second digital signature are deleted at the deleting.

9. A non-transitory computer-readable recording medium storing therein a document verifying program that causes a computer to execute:
receiving input of an electronic document;
dividing the electronic document received at the receiving into arbitrary components;
calculating a hash value for each of the components obtained at the dividing;
correlating, for each component among the components, the hash value calculated for the component at the calculating and a random number allocated to the component according to an appearance position of the component in the electronic document;
creating for each component and based on the hash value and the random number correlated for the component at the correlating, a digital signature;
appending to each component, the digital signature created for the component at the creating;
receiving designation of a component to be concealed, the component being among the components;
deleting the second digital signature appended to the component to be concealed designated in the designation received at the receiving designation;
setting the electronic document to be an electronic document having a component that is to be concealed, by correlating the electronic document and the hash value of the component for which the second digital signature is deleted at the deleting;
receiving input of the electronic document set at the setting;
replacing each component of the electronic document set at the setting and received at the receiving, with a hash value calculated for the component, by calculating hash values for the components constituting the electronic document set at the setting and received at the receiving;
determining validity of the hash values replacing the components at the replacing and validity of random numbers allocated to the hash values, based on the aggregate digital signature appended to the electronic document;
verifying authenticity of the electronic document based on a determination result obtained at the determining; and
outputting a verification result obtained at the verifying, wherein
the correlating includes correlating for each component, the hash value and the random number correlated for the component at the correlating with a common random number allocated to and common to all the components, the creating includes creating the first digital signature and the second digital signature for each component, based on the common random number, the hash value and the random number that are correlated for the component at the correlating,
the creating includes creating an aggregate digital signature of first digital signatures or second digital signatures created respectively for the components at the creating,
the appending includes appending the aggregate digital signature created at the creating to the electronic document, and
the determining includes determining, for each component among the components constituting the electronic document set at the setting, whether the random number allocated to the component accords to the appearance position of the component in the electronic document set at the setting and received at the receiving.

10. The non-transitory computer-readable recording medium according to claim 9, wherein
the correlating includes correlating for each component, the hash value and the random number correlated for the component at the correlating with a common random number allocated to and common to all the components, and
the creating includes creating the digital signature for each component, based on the common random number, the hash value and the random number that are correlated for the component at the correlating.

11. A document verifying method comprising:
receiving input of an electronic document;
dividing the electronic document received at the receiving into arbitrary components;
calculating a hash value for each of the components obtained at the dividing;
correlating, for each component among the components, the hash value calculated for the component at the calculating and a random number allocated to the component according to an appearance position of the component in the electronic document;
creating, using a microprocessor, for each component and based on the hash value and the random number correlated for the component at the correlating, a first digital signature and a second digital signature that are different from each other;
appending to each component, the first digital signature and the second digital signature created for the component at the creating;
receiving designation of a component to be concealed, the component being among the components;
deleting the second digital signature appended to the component to be concealed designated in the designation received at the receiving designation;
setting the electronic document to be an electronic document having a component that is to be concealed, by correlating the electronic document and the hash value of the component for which the second digital signature is deleted at the deleting;
receiving input of the electronic document set at the setting;
replacing each component of the electronic document set at the setting and received at the receiving, with a hash value calculated for the component, by calculating hash values for the components constituting the electronic document set at the setting and received at the receiving;
determining validity of the hash values replacing the components at the replacing and validity of random numbers allocated to the hash values, based on the aggregate digital signature appended to the electronic document;

verifying authenticity of the electronic document based on a determination result obtained at the determining; and the correlating includes correlating for each component, the hash value and the random number correlated for the component at the correlating with a common random number allocated to and common to all the components, the creating includes creating the first digital signature and the second digital signature for each component, based on the common random number, the hash value and the random number that are correlated for the component at the correlating, the creating includes creating an aggregate digital signature of first digital signatures or second digital signatures created respectively for the components at the creating, the appending includes appending the aggregate digital signature created at the creating to the electronic document, and the determining includes determining, for each component among the components constituting the electronic document set at the setting, whether the random number allocated to the component accords to the appearance position of the component in the electronic document set at the setting and received at the receiving.

* * * * *